United States Patent
Wang et al.

(10) Patent No.: US 11,638,284 B2
(45) Date of Patent: Apr. 25, 2023

(54) DYNAMIC TIME DIVISION DUPLEXING FOR ENHANCED SIDELINK CONTROL SIGNALING

(71) Applicant: QUALCOMM Incorporated, San Diego, CA (US)

(72) Inventors: Xiaojie Wang, Hillsborough, NJ (US); Piyush Gupta, Bridgewater, NJ (US); Junyi Li, Franklin Park, NJ (US); Jing Sun, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 65 days.

(21) Appl. No.: 17/144,990

(22) Filed: Jan. 8, 2021

(65) Prior Publication Data
US 2022/0225374 A1    Jul. 14, 2022

(51) Int. Cl.
*H04W 72/12* (2009.01)
*H04L 1/00* (2006.01)
(Continued)

(52) U.S. Cl.
CPC ....... *H04W 72/1284* (2013.01); *H04L 1/0061* (2013.01); *H04L 5/14* (2013.01); *H04W 72/1268* (2013.01); *H04W 88/06* (2013.01)

(58) Field of Classification Search
None
See application file for complete search history.

(56) References Cited

U.S. PATENT DOCUMENTS 11,445,529 B2 *   9/2022   Uziel .............. H04W 72/1278
2016/0338095 A1 * 11/2016   Faurie ............. H04W 72/1278
(Continued)

OTHER PUBLICATIONS

APPLE: "On Remaining Details of Mode 1 Resource Allocation", 3GPP Draft, 3GPP TSG RAN WG1 #100bis, R1-2002324, 3rd Generation Partnership Project (3GPP), Mobile Competence Centre, 650, Route Des Lucioles, F-06921 Sophia-Antipolis Cedex, France, vol. RAN WG1, No. e-Meeting, Apr. 20-30, 2020 Apr. 11, 2020 (Apr. 11, 2020), XP051875544, 8 Pages, Retrieved from the Internet: URL: https://ftp.3gpp.org/tsg_ran/WG1_RL1/TSGR1_100b_e/Docs/R1-2002324.zip R1-2002324 on Remaining Details of Mode 1 Resource Allocation.docx [retrieved on Apr. 11, 2020] Paragraph [2.4.3].

(Continued)

*Primary Examiner* — Lonnie V Sweet
(74) *Attorney, Agent, or Firm* — Holland & Hart LLP

(57) ABSTRACT

Methods, systems, and devices for wireless communications are described. In some wireless communications networks, a first wireless device may transmit sidelink control information to a second wireless device, which includes a first scheduling for an uplink transmission by a second wireless device during a first slot. The second wireless device may decode the sidelink control information to determine an operating mode of the first wireless device during the first slot, such as a transmitting mode or a receiving mode. Based on the operating mode, the second wireless device may drop or delay the uplink transmission. In some cases, the first wireless device may schedule an uplink transmission to be performed by the second wireless device during a second slot, and the first wireless device may switch from a transmitting mode to a receiving mode in order to receive the scheduled uplink transmission from the second wireless device.

28 Claims, 20 Drawing Sheets

(51) Int. Cl.
*H04L 5/14* (2006.01)
*H04W 88/06* (2009.01)
*H04W 72/1268* (2023.01)

(56) References Cited

U.S. PATENT DOCUMENTS

| | | | | |
|---|---|---|---|---|
| 2019/0306835 | A1* | 10/2019 | Hoang | H04W 72/0493 |
| 2020/0296796 | A1* | 9/2020 | Uchiyama | H04W 28/26 |
| 2021/0266868 | A1* | 8/2021 | Shin | H04L 1/0061 |
| 2021/0345396 | A1* | 11/2021 | Yu | H04W 52/383 |
| 2021/0410158 | A1* | 12/2021 | Xue | H04W 28/04 |
| 2022/0007390 | A1* | 1/2022 | Basu Mallick | H04W 72/1268 |
| 2022/0007403 | A1* | 1/2022 | Li | H04W 72/1289 |
| 2022/0039100 | A1* | 2/2022 | Yoshioka | H04W 72/042 |
| 2022/0053496 | A1* | 2/2022 | Yu | H04L 1/1861 |
| 2022/0070844 | A1* | 3/2022 | Lee | H04L 1/1812 |
| 2022/0086860 | A1* | 3/2022 | Panteleev | H04W 4/40 |
| 2022/0086869 | A1* | 3/2022 | Fong | H04L 1/1887 |
| 2022/0167310 | A1* | 5/2022 | Wang | H04L 1/1825 |
| 2022/0167402 | A1* | 5/2022 | Liu | H04W 28/04 |
| 2022/0255680 | A1* | 8/2022 | Moon | H04W 72/1284 |
| 2022/0361204 | A1* | 11/2022 | Zhao | H04W 72/1268 |

OTHER PUBLICATIONS

APPLE: "Remaining Issues of Model Resource Allocation", 3GPP Draft, 3GPP TSG RAN WG1 #101, R1-2004216, 3rd Generation Partnership Project (3GPP), Mobile Competence Centre, 650, Route Des Lucioles, F-06921 Sophia-Antipolis Cedex, France, vol. RAN WG1, No. e-Meeting, May 25-Jun. 5, 2020, May 16, 2020 (May 16, 2020), XP051885974, 7 Pages, Retrieved from the Internet: URL: https://ftp.3gpp.org/tsg_ran/WG1_RL1/TSGR1_101-e/Docs/R1-2004216.zip. R1-2004216 Remaining Issues of Model Resource Allocation.docx [Retrieved on May 16, 2020] Section 2.3.2, Paragraph [2.1.1], Paragraph [02.2], Paragraph [2.3.2].
International Search Report and Written Opinion—PCT/US2021/056688—ISA/EPO—dated Feb. 28, 2022.

* cited by examiner

DYNAMIC TIME DIVISION DUPLEXING FOR ENHANCED SIDELINK CONTROL SIGNALING

FIELD OF TECHNOLOGY

The following relates to wireless communications, including dynamic time division duplexing for enhanced sidelink control signaling.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

Some wireless communications networks may support sidelink communications between wireless devices (such as UEs) using physical sidelink control channels (PSCCHs) and physical sidelink shared channels (PSSCHs). Conventional techniques for coordinating sidelink communications between the wireless devices, however, may be deficient.

SUMMARY

The described techniques relate to improved methods, systems, devices, and apparatuses that support dynamic time division duplexing for enhanced sidelink control signaling. Generally, the described techniques provide for increased coordination between devices in a wireless communications network, for example, those operating in an industrial internet-of-things (I-IoT) deployment.

In some examples, a first wireless device may transmit sidelink control information to a second wireless device, the sidelink control information including a first scheduling for an uplink transmission by the second wireless device during a first slot or transmission time interval. The second wireless device may decode the sidelink control information to determine an operating mode (e.g., a transmitting mode or receiving mode) of the first wireless device during the first slot. For example, the second wireless device may determine the operating mode using information provided in the sidelink control information (e.g., a transmitter identifier of the first wireless device, a one-bit indication, or a cyclic redundancy check (CRC) scrambling code). Based on the determined operating mode of the first wireless device during the first slot, the second wireless device may drop or delay the uplink transmission accordingly.

In some other examples, the first wireless device may switch operating modes in accordance with scheduling of the second wireless device. For example, the first wireless device may schedule an uplink transmission to be performed by the second wireless device during a second slot, and the first wireless device may switch from a transmitting mode during a first slot to a receiving mode during the second slot in order to receive the scheduled uplink transmission from the second wireless device.

A method for wireless communications at a first wireless device is described. The method may include receiving, from a second wireless device and via a sidelink communication link, sidelink control information including a first scheduling for an uplink transmission from the first wireless device to the second wireless device during a first slot, decoding at least a portion of the sidelink control information, the sidelink control information including an indication of an operating mode of the second wireless device in the first slot, and applying a second scheduling for the uplink transmission different from the first scheduling, the second scheduling based on the operating mode of the second wireless device in the first slot.

An apparatus for wireless communications at a first wireless device is described. The apparatus may include a processor, memory in electronic communication with the processor, and instructions stored in the memory. The instructions may be executable by the processor to cause the apparatus to receive, from a second wireless device and via a sidelink communication link, sidelink control information including a first scheduling for an uplink transmission from the first wireless device to the second wireless device during a first slot, decode at least a portion of the sidelink control information, the sidelink control information including an indication of an operating mode of the second wireless device in the first slot, and apply a second scheduling for the uplink transmission different from the first scheduling, the second scheduling based on the operating mode of the second wireless device in the first slot.

Another apparatus for wireless communications at a first wireless device is described. The apparatus may include means for receiving, from a second wireless device and via a sidelink communication link, sidelink control information including a first scheduling for an uplink transmission from the first wireless device to the second wireless device during a first slot, means for decoding at least a portion of the sidelink control information, the sidelink control information including an indication of an operating mode of the second wireless device in the first slot, and means for applying a second scheduling for the uplink transmission different from the first scheduling, the second scheduling based on the operating mode of the second wireless device in the first slot.

A non-transitory computer-readable medium storing code for wireless communications at a first wireless device is described. The code may include instructions executable by a processor to receive, from a second wireless device and via a sidelink communication link, sidelink control information including a first scheduling for an uplink transmission from the first wireless device to the second wireless device during a first slot, decode at least a portion of the sidelink control information, the sidelink control information including an indication of an operating mode of the second wireless device in the first slot, and apply a second scheduling for the uplink transmission different from the first scheduling, the second scheduling based on the operating mode of the second wireless device in the first slot.

Some examples of the method, apparatuses, and non-transitory computer-readable medium described herein may further include operations, features, means, or instructions for determining an operating mode of the first wireless device during the first slot based on the sidelink control information, where applying the second scheduling of the uplink transmission may be further based on the operating mode of the first wireless device in the first slot.

In some examples of the method, apparatuses, and non-transitory computer-readable medium described herein, applying the second scheduling of the uplink transmission may include operations, features, means, or instructions for delaying the uplink transmission from the first slot to a second slot based on the second wireless device operating in the transmitting mode during the first slot.

In some examples of the method, apparatuses, and non-transitory computer-readable medium described herein, applying the second scheduling of the uplink transmission may include operations, features, means, or instructions for dropping the uplink transmission in the first slot based on the second wireless device operating in the transmitting mode during the first slot and transmitting, to the second wireless device, an indication of the dropping of the uplink transmission.

Some examples of the method, apparatuses, and non-transitory computer-readable medium described herein may further include operations, features, means, or instructions for receiving, from the second wireless device, a rescheduling of the uplink transmission in a second slot based on the dropping of the uplink transmission in the first slot.

In some examples of the method, apparatuses, and non-transitory computer-readable medium described herein, applying the second scheduling of the uplink transmission may include operations, features, means, or instructions for receiving downlink control information from the second wireless device during the first slot in accordance with the receiving mode, the downlink control information scheduling the uplink transmission from the first wireless device to the second wireless device during a second slot.

In some examples of the method, apparatuses, and non-transitory computer-readable medium described herein, the indication of the operating mode includes a transmitter identifier associated with the second wireless device received in a second portion of the sidelink control information.

In some examples of the method, apparatuses, and non-transitory computer-readable medium described herein, the indication of the operating mode includes a one-bit indication of the operating mode of the first wireless device or the second wireless device received in a first portion of the sidelink control information.

In some examples of the method, apparatuses, and non-transitory computer-readable medium described herein, the indication of the operating mode includes a cyclic redundancy check scrambling sequence associated with the first wireless device or the second wireless device received in a first portion of the sidelink control information.

Some examples of the method, apparatuses, and non-transitory computer-readable medium described herein may further include operations, features, means, or instructions for scheduling the uplink transmission may be based on a time offset between receiving the sidelink control information and transmitting the uplink transmission.

Some examples of the method, apparatuses, and non-transitory computer-readable medium described herein may further include operations, features, means, or instructions for receiving a radio resource control message that indicates a set of sidelink resources of the sidelink communication link which may be dedicated for transmission of uplink control information or reception of downlink control information, where the uplink transmission may be transmitted via at least a subset of the set of sidelink resources.

In some examples of the method, apparatuses, and non-transitory computer-readable medium described herein, the uplink transmission includes an uplink control information message, an uplink data message, or both.

A method for wireless communications at a second wireless device is described. The method may include transmitting, to a first wireless device and via a sidelink communication link in a first slot, sidelink control information including a scheduling for an uplink transmission from the first wireless device to the second wireless device during a second slot and switching an operating mode of the second wireless device to receive the uplink transmission in the second slot in accordance with the scheduling.

An apparatus for wireless communications at a second wireless device is described. The apparatus may include a processor, memory in electronic communication with the processor, and instructions stored in the memory. The instructions may be executable by the processor to cause the apparatus to transmit, to a first wireless device and via a sidelink communication link in a first slot, sidelink control information including a scheduling for an uplink transmission from the first wireless device to the second wireless device during a second slot and switch an operating mode of the second wireless device to receive the uplink transmission in the second slot in accordance with the scheduling.

Another apparatus for wireless communications at a second wireless device is described. The apparatus may include means for transmitting, to a first wireless device and via a sidelink communication link in a first slot, sidelink control information including a scheduling for an uplink transmission from the first wireless device to the second wireless device during a second slot and means for switching an operating mode of the second wireless device to receive the uplink transmission in the second slot in accordance with the scheduling.

A non-transitory computer-readable medium storing code for wireless communications at a second wireless device is described. The code may include instructions executable by a processor to transmit, to a first wireless device and via a sidelink communication link in a first slot, sidelink control information including a scheduling for an uplink transmission from the first wireless device to the second wireless device during a second slot and switch an operating mode of the second wireless device to receive the uplink transmission in the second slot in accordance with the scheduling.

In some examples of the method, apparatuses, and non-transitory computer-readable medium described herein, switching the operating mode of the second wireless device may include operations, features, means, or instructions for switching from a transmitting mode in the first slot to a receiving mode in the second slot to receive the uplink transmission from the first wireless device in the second slot.

In some examples of the method, apparatuses, and non-transitory computer-readable medium described herein, the second wireless device switches from a transmitting mode to a receiving mode based on a time offset between transmitting the sidelink control information and scheduling of the uplink transmission.

Some examples of the method, apparatuses, and non-transitory computer-readable medium described herein may further include operations, features, means, or instructions for receiving a radio resource control message that indicates a set of sidelink resources of the sidelink communication link which may be dedicated for transmission of uplink control information or reception of downlink control information, where the uplink transmission may be transmitted via at least a portion of the set of sidelink resources.

In some examples of the method, apparatuses, and non-transitory computer-readable medium described herein, the uplink transmission includes an uplink control information message, an uplink data message, or both.

DETAILED DESCRIPTION

Figure 1:
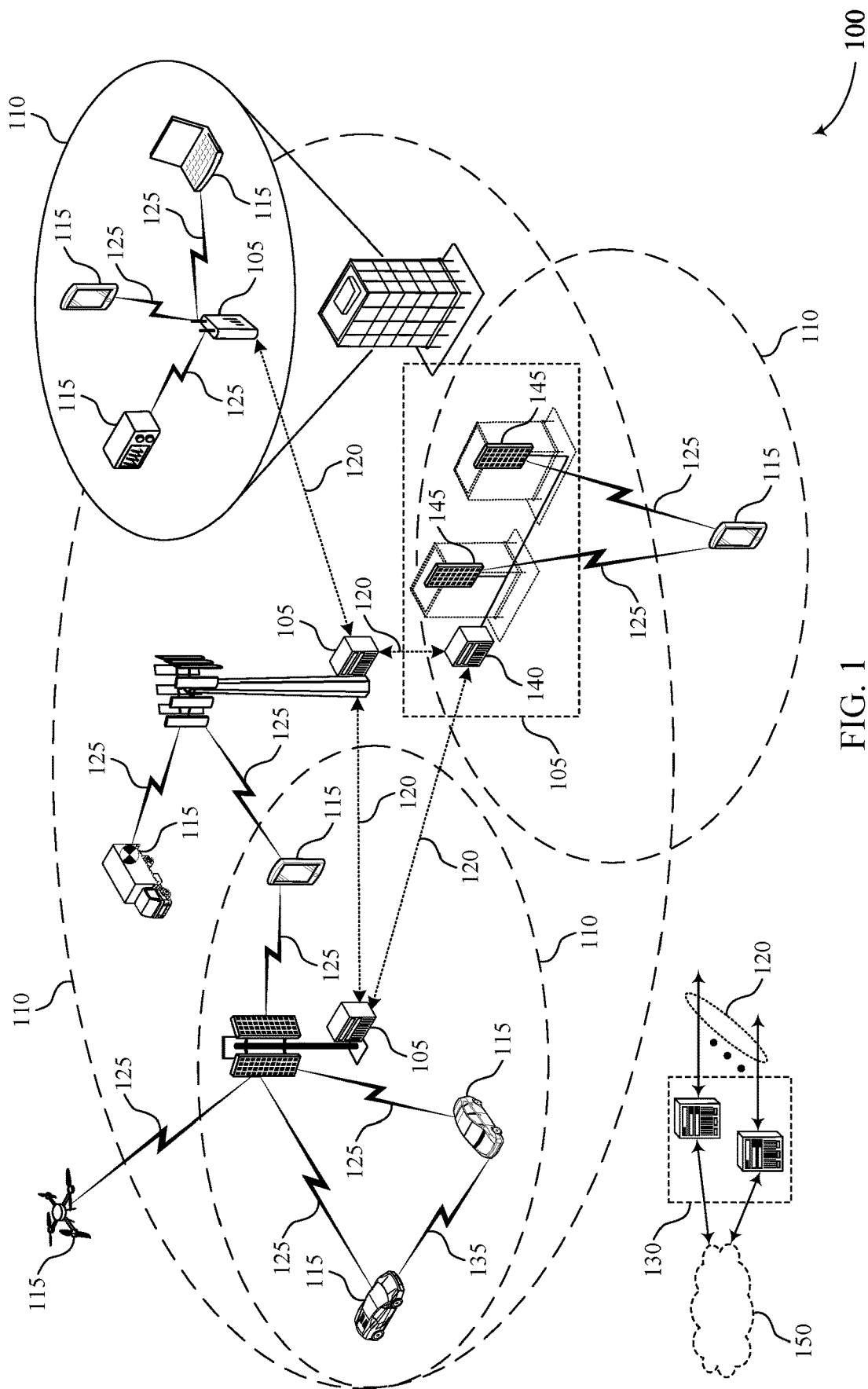
FIG. 1 illustrates an example of a wireless communications system that supports dynamic time division duplexing for enhanced sidelink control signaling in accordance with aspects of the present disclosure.

Some wireless communications networks may support sidelink communications between a number of wireless devices to reduce signaling traffic and increase network coverage. Sidelink communications in a wireless network may be performed via physical sidelink control channels (PSCCHs) and physical sidelink shared channels (PSSCHs). Some network architectures, such as an industrial internet-of-things (I-IoT) networks, may benefit from the exchange of sidelink control information (SCI) to efficiently convey inter-device coordination signaling, resource selection information, collision detection information, channel status and feedback reporting information between devices.

In some examples, a base station may transmit a control message indicating a set of resources (e.g., time resources, frequency resources, spatial resources) to be used for a sidelink communication link between one or more sets of devices in a wireless network, for example, between a first wireless device (e.g., a programmable logic controller (PLC)) and one or more secondary wireless devices (e.g., sensor/actuators (S/As)). In some cases, the sidelink resources may include resources dedicated for transmission of sidelink-uplink control information (S-UCI) and sidelink-downlink control information (S-DCI). In addition, the sidelink transmissions (e.g., S-DCI, S-UCI, and data messages) may share the same frequency spectrum and are separated in the time domain via time division duplexing (TDD). Accordingly, such a TDD configuration may support the first wireless device transmitting during a first slot while the second device receives during the first slot, or vice versa. To effectively support such a TDD configuration, the first wireless device and the second wireless device may coordinate the transmission of sidelink control information using a number of techniques.

In some examples, the first wireless device (e.g., a PLC) may coordinate the transmission of the uplink transmission (e.g., S-UCI) by the second wireless device (e.g., an S/A) during a given slot. For example, the first wireless device may transmit S-DCI (or any other short downlink transmission) during a first slot to schedule transmission of the S-UCI (or any other uplink transmission, as scheduled by a sidelink resource pool, for example, a physical sidelink shared channel (PSSCH)) by the second wireless device during a second slot. In some cases where the first wireless device and the second wireless device operate in accordance with the TTD configuration, upon scheduling the second wireless device to transmit the uplink transmission during the second slot (e.g., granting an S-UCI transmission by the second wireless device), the first wireless device may ensure that it is in a receiving mode during the second slot to receive the uplink transmission in accordance with the scheduling (e.g., during the S-UCI transmission occasion). In such cases, the first wireless device may switch operating modes (e.g., between transmission and reception modes) to accommodate transmissions scheduled for the second wireless device.

Additionally, or alternatively, the first wireless device may transmit a downlink transmission (e.g., S-DCI) during the first slot to schedule one or more other downlink transmissions to be performed by first wireless device (e.g., during the first slot or in subsequent slots) to the second wireless device. In such cases, the first wireless device may ensure that it is in a transmission mode during the slot in which the one or more other downlink transmissions are scheduled.

In some other examples, the second wireless device (e.g., an S/A) may detect a sidelink control information transmission by the first wireless device during the first slot, and may use information provided in the sidelink control information to infer the communication mode (e.g., transmission or reception) of the first wireless device in the first slot. In some examples, the second wireless device may receive a transmitter identifier (e.g., a Tx-ID) in a second portion of the sidelink control information, and may determine that the first wireless device is transmitting during the first slot. In such cases where the first wireless device is transmitting in the first slot, the second wireless device may drop or delay the transmission of S-UCI in the first slot.

In some other examples, the second wireless device may receive an indication in a first portion of the sidelink control information (e.g., a one-bit indicator) which indicates the operating mode of the first wireless device in the first slot. Based on the indicator, the second wireless device may determine that the first wireless device is transmitting during the first slot, and may drop or delay the transmission of S-UCI in the first slot accordingly.

In some other examples, the second wireless device may determine whether the first wireless device is transmitting or receiving during the first slot based on a cyclic redundancy check (CRC) scrambling code associated with a first portion of the sidelink control information. Based on the CRC scrambling code, the second wireless device may determine that the first wireless device is transmitting during the first slot, and may drop or delay the transmission of S-UCI in the first slot accordingly.

Particular aspects of the subject matter described herein may be implemented to realize one or more advantages. The described techniques may support improvements in techniques for wireless devices to coordinate the transmission of sidelink control information in a network associated with a TDD transmission structure. In some examples, the techniques may allow for additional techniques to reduce scheduling conflict and increase the efficiency of sidelink control information transmissions in an I-IoT setting. In addition, the described techniques may reduce latency and reduced signaling traffic the wireless communications system.

Aspects of the disclosure are initially described in the context of wireless communications systems. Aspects of the disclosure are further illustrated by and described with reference to apparatus diagrams, system diagrams, sidelink resource configurations, process flows, and flowcharts that relate to dynamic time division duplexing for enhanced sidelink control signaling.

FIG. 1 illustrates an example of a wireless communications system 100 that supports dynamic time division duplexing for enhanced sidelink control signaling in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some examples, a base station 105 may transmit control signaling which indicates a set of resources (e.g., time resources, frequency resources, spatial resources) to be used for a sidelink communication link between one or more sets of devices in wireless communications system 100, for example, between a first wireless device (e.g., a first UE 115 such as a PLC) and one or more secondary wireless devices (e.g., a second UE 115 such as an S/A). In some examples, the UEs may use a dedicated pool of sidelink resources for transmission of uplink control information (e.g., S-UCI) and downlink control information (e.g., S-DCI) and in accordance with TDD configuration. Accordingly, a first UE 115 and a second UE 115 may coordinate such that only one UE 115 is transmitting during a given TTI in accordance with the TDD configuration.

In some examples, the first UE 115 (e.g., a PLC) may coordinate the transmission of the uplink transmission (e.g., S-UCI) by the second wireless UE 15 (e.g., an S/A) during a given slot. For example, the first UE 115 may ensure that it is in a receiving mode during a slot in which it has scheduled an uplink transmission from the second UE 115. In some other examples, the second UE 115 may detect a sidelink control information transmission from the first UE 115 including a transmitter identifier (e.g., a Tx-ID) which identifies that the first UE 115 is transmitting in the first slot, and the second UE 115 may drop or delay the transmission of S-UCI in the first slot.

In some other examples, the second wireless device may receive an indication in a first portion of the sidelink control information (e.g., a one-bit indicator) which indicates the operating mode of the first wireless device in the first slot, or the second UE 115 may determine the transmitting mode of the first UE 115 based on a CRC scrambling code associated with the sidelink control information. Based on the one-bit indicator or the CRC scrambling code, the second wireless device may determine that the first wireless device is transmitting during the first slot, and may drop or delay the transmission of S-UCI in the first slot accordingly.

Figure 2:
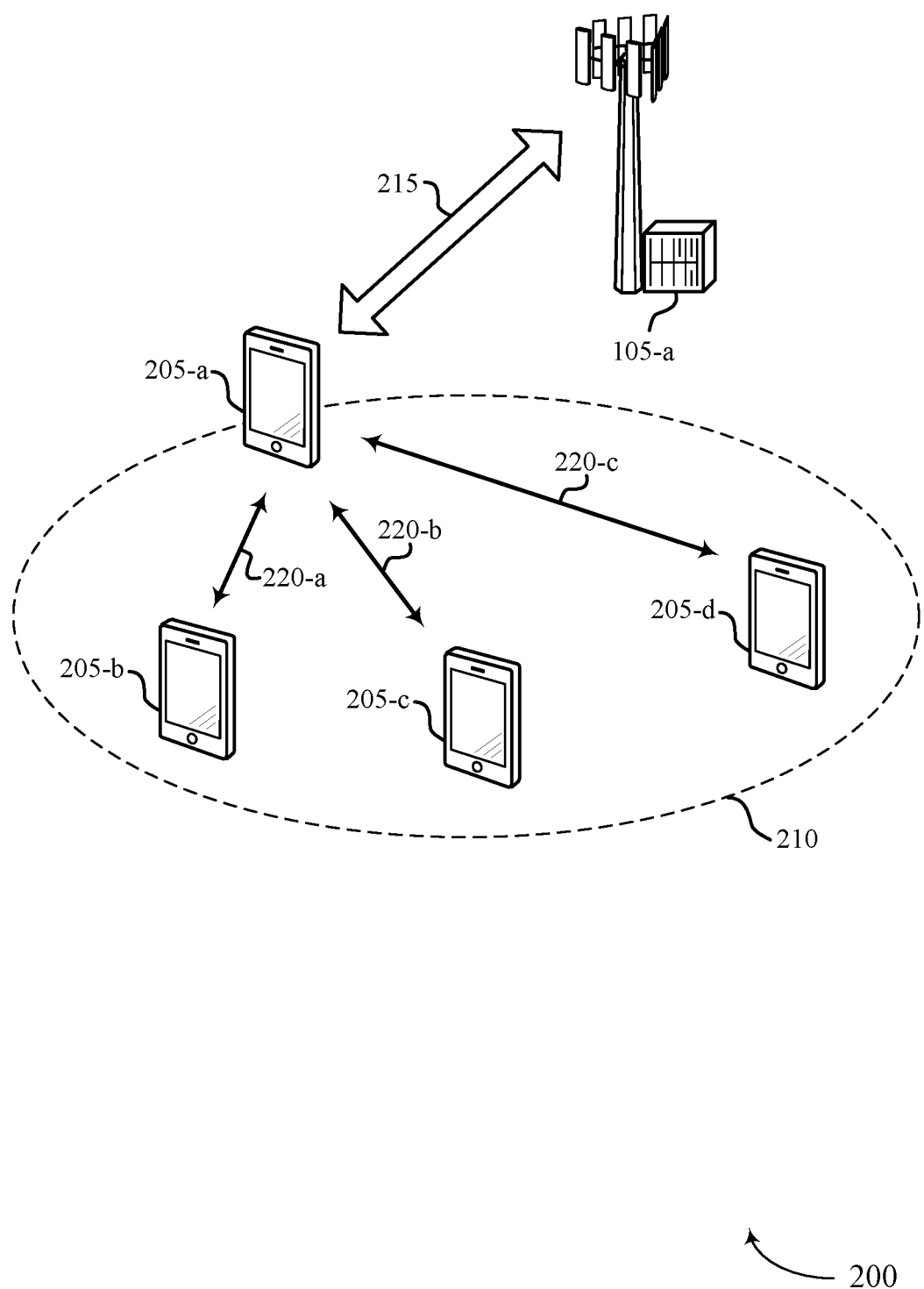
FIG. 2 illustrates an example of a wireless communications system that supports dynamic time division duplexing for enhanced sidelink control signaling in accordance with aspects of the present disclosure.

FIG. 2 illustrates an example of a wireless communications system 200 that supports dynamic time division duplexing for enhanced sidelink control signaling in accordance with aspects of the present disclosure. The wireless communications system 200 may include a base station 105-*a*, first wireless device 205-*a*, a second wireless device 205-*b*, a third wireless device 205-*c*, and a fourth wireless device 205-*d*. The base station 105-*a* may be an example of one of the base stations 105 described with reference to FIG. 1. The first wireless device 205-*a*, second wireless device 205-*b*, third wireless device 205-*c*, and fourth wireless device 205-*d* may be examples of one or more of the UEs 115, base stations 105, or other wireless devices described with reference to FIG. 1. In some cases, each of the wireless devices 205 may include a UE 115. Additionally, or alternatively, in the context of an I-IoT deployment 210, the first wireless device 205-*a* may implement a PLC, and the wireless devices 205-*b*, 205-*c*, and 205-d may implement S/As which may communicate directly with the PLC.

The first wireless device 205-*a* (e.g., a PLC) may communicate with the base station 105-*a* using a communication link 215, which may be an example of a direct link (e.g., a Uu link) between the first wireless device 205-*a* and the base station 105-*a*. The direct link may in some cases be a bi-directional link that enables both uplink and downlink communication between the base station 105-*a* and the first wireless device 205-*a*. For example, the first wireless device 205-*a* may transmit uplink signals, such as uplink control signals or uplink data signals, to the base station 105-*a* using the communication link 215 and the base station 105-*a* may transmit downlink signals, such as downlink control signals or downlink data signals, to the first wireless device 205-*a* using the communication link 215.

In some examples, the first wireless device 205-*a*, the second wireless device 205-*b*, the third wireless device 205-*c* and the fourth wireless device 205-*d* may communicate with one another using communication links 220, which may be examples of sidelink communication links or PC5 links. For example, the first wireless device 205-*a* (e.g., a PLC) may communicate with wireless devices 205-*b*, 205-*c*, and 205-*d* (e.g., S/As) via communication links 220-*a*, 220-*b*, and 220-*c*, respectively.

In some cases, I-IoT networks may require strict latency requirements (e.g., 1-2 ms latency) as well as high reliability requirements (e.g., $10^{-6}$ error rate). In such cases, carrying out all communications directly between the base station 105-*a* and each wireless device in the network may detrimentally affect latency and reliability. Accordingly, sidelink communications between a PLC (e.g., first wireless device 205-*a*) and S/As (e.g., wireless devices 205-*b*, 205-*c*, and 205-*d*) may support a sidelink communications framework between a large number of devices in an I-IoT setting which reduces latency and improves reliability by reducing the number of direct links between devices and the base station 105-*a*, and allowing for a wireless device such as a PLC to schedule sidelink communications between neighboring devices.

In some aspects, the communication links 220 may be included within a sidelink network 210 of the wireless communications system 200. The sidelink network 210 (e.g., sidelink network including the communication links 215-*a*, 215-*b*) may be configurable to operate in a "Mode 1" and/or a "Mode 2." While operating in Mode 1, the sidelink network 210 may be managed (e.g., coordinated) by the base station 105-*a* such that the base station 105-*a* may manage resource allocation over the communication links 215 and 220, and may allocate sets of resources within the communication links 220 to the respective wireless devices 205-*a*, 205-*b*, 205-*c*, and 205-*d*. In some cases, the base station 105-*a* may allocate sets of sidelink resources to the respective wireless devices 205 during Mode 1 operation via RRC signaling, DCI, or both. During Mode 1 operation, the base station 105-*a* may allocate sidelink resources via dynamic grants, configured grants (e.g., type 1 configured grants, type 2 configured grants), or both.

Comparatively, while operating in Mode 2, the sidelink network 210 may not be managed (e.g., may not be coordinated) by the base station 105-*a*. Without coordination or management of the resources of the sidelink network 210 during the Mode 2 operation, the wireless devices 205 may be configured to monitor the sidelink network, and determine sets of sidelink resources which are available for transmission of sidelink signals via the sidelink communication links 220. In particular, the first wireless device 205-*a* (e.g., a PLC) may determine sidelink resources which are to be used for the communication links 220 by monitoring the communication links 220 (e.g., perform channel sensing), and blindly decoding some or all PSCCH channels within the communication links 220 to identify sidelink resources which have been reserved by other wireless devices. Subsequently, the first wireless device 205-*a* (e.g., a PLC) may report available sidelink resources to an upper layer of the network, and may allocate sets of sidelink resources to each of the wireless devices 205-*b*, 205-*c*, and 205-*d*.

In the context of I-IoT networks, wireless devices may exchange short control signaling such as inter-device (e.g., inter-UE) coordination signaling (e.g., resource selection information, collision detection information), channel status information (CSI) reporting, HARQ, scheduling requests, etc. A wireless device such as an S/A (e.g., wireless device 205-*b*, 205-*c*, 205-*d*) may transmit S-UCI on a PSCCH to convey sidelink control information to a PLC. In such cases, S-UCI may refer to an "uplink transmission" including control information which is transmitted from any of wireless devices 205-*b*, 205-*c*, and 205-*d* to the first wireless device 205-*a*. In addition, S-DCI may be sidelink control information which is transmitted from a PLC to a S/A on a PSCCH. In such cases, S-DCI may refer to a "downlink transmission" including control information which is transmitted from the first wireless device 205-*a* to any of the wireless devices 205-*b*, 205-*c*, or 205-*d*.

According to some communications techniques, however, sidelink control information (e.g., physical sidelink control channel (PSCCH) information) may only be transmitted in conjunction with physical sidelink shared channel (PSSCH) information. Therefore in such techniques, sidelink control information may not be transmitted in the absence of PSSCH data, or transmitting the sidelink control information may otherwise be inefficient. Therefore, without PSSCH data, sidelink control information used to schedule transmissions for sidelink-related control information may not be sent. Nevertheless, there are times when a sidelink wireless device may have sidelink-related control information to transmit even in the absence of any sidelink transmissions (e.g., PSSCH data transmissions).

Accordingly, the wireless communications system 200 may provide for the scheduling and transmission of control information (e.g., S-UCI) via a sidelink communication link even in the absence of sidelink data transmissions. In particular, the wireless communications system 200 may support techniques which enable for control information to be scheduled and transmitted within the network via coordination between the sidelink wireless devices, and in accordance with a TDD configuration for the sidelink transmissions.

The base station 105-*a* may transmit a control message to the first wireless device 205-*a* (e.g., the PLC) indicating a set of resources to be used for a sidelink communication link (e.g., sidelink communication link 220-*a*) with the second wireless device 205-*b*. The control message may include an allocation of resources (e.g., time resources, frequency resources, spatial resources) associated with a sidelink communication link (e.g., communication link 220-*a*) to be used for sidelink communications between the first wireless device 205-*a* and the second wireless device 205-*b*. In addition, the sidelink communications between devices in the network my be scheduled in accordance with a TDD configuration, in which the first wireless device 205-*a* may be in a transmitting mode during a first slot of the sidelink resource allocation while the second wireless device 205-*b* may be in a receiving mode during the first slot. The wireless devices may switch between transmitting and receiving modes based on the TDD configuration.

In some examples, the scheduling of the transmission of sidelink control information may be determined by the first wireless device (e.g., the PLC). In such examples, the first wireless device may transmit sidelink control information (e.g., S-DCI) to the second wireless device 205-*b* during a first slot, and the S-DCI may schedule the transmission of S-UCI by the second wireless device 205-*b* during a second slot. Based on scheduling the second wireless device 205-*b* in the second slot, the first wireless device ensures that it is in a reception mode for the second slot to receive the S-UCI from the second wireless device.

In some other examples, the scheduling of the transmission of sidelink control information may be determined by the second wireless device (e.g., the S/A). In such examples, the second wireless device 205-*b* may receive sidelink control information (e.g., S-DCI) from the first wireless device 205-*a* during a first slot, and the S-DCI may schedule the transmission of S-UCI by the second wireless device 205-*b*. The sidelink control information may include a transmitter ID which indicates that the first wireless device 205-*a* is transmitting during the first slot, and the second wireless device 205-*b* may drop or delay the transmission of S-UCI based on the transmitter ID. In some examples, the sidelink control information may include a one-bit indicator which indicates the transmission mode of the first wireless device or the sidelink control information may include a CRC scrambling sequence which indicates whether the first wireless device 205-*a* is in a receiving mode or a transmitting mode in the first slot, or a different CRC scrambling code associated with a second sidelink control information may indicate whether the first wireless device 205-*a* is in a receiving mode or a transmitting mode in the first slot.

In some other example, the sidelink control information may contain one or more subsets of sidelink control information (e.g., SCI-1, SCI-2), containing one or more bit fields, where the one or more bit fields (or a number of combinations of the one or more bit fields) may indicate an operating mode of the first wireless device 205-*a*, an operating mode of the second wireless device 205-*b*, or both.

In some cases, the operating mode of the first wireless device 205-*a* or the second wireless device 205-*b* may be determined via a signal power strength measurement associated with the sidelink resource pool. For example, if a measured signal power strength associated with the sidelink resource pool is below threshold value in all subchannels during a slot, the second wireless device 205-*b* may determine that the first wireless device 205-*a* is transmitting during the slot.

In some other examples, the second wireless device 205-*b* may derive channel parameters and/or physical parameters based on reference signal detection, reference signal parameters transmitted by the first wireless device 205-*a* or the second wireless device 205-*b* in a first or second portion of the sidelink control information (e.g., SCI-1 or SCI-2) or in the PSSCH, (e.g., reference signals such as DM-RS, CSI-RS, PT-RS, or any combination thereof transmitted by the first wireless device 205-*a* may indicate that the first wireless device 205-*a* is in a transmission mode). Based on the transmitted reference signal or the various other derived channel parameters or physical parameters described herein, the second wireless device 205-*b* determine an operating mode of the first device 205-*a*.

Accordingly, the second wireless device 205-*b* may determine whether it is to transmit S-UCI or receive S-DCI in the first slot, or whether it is to delay or drop the transmission of the S-UCI.

Figure 3:
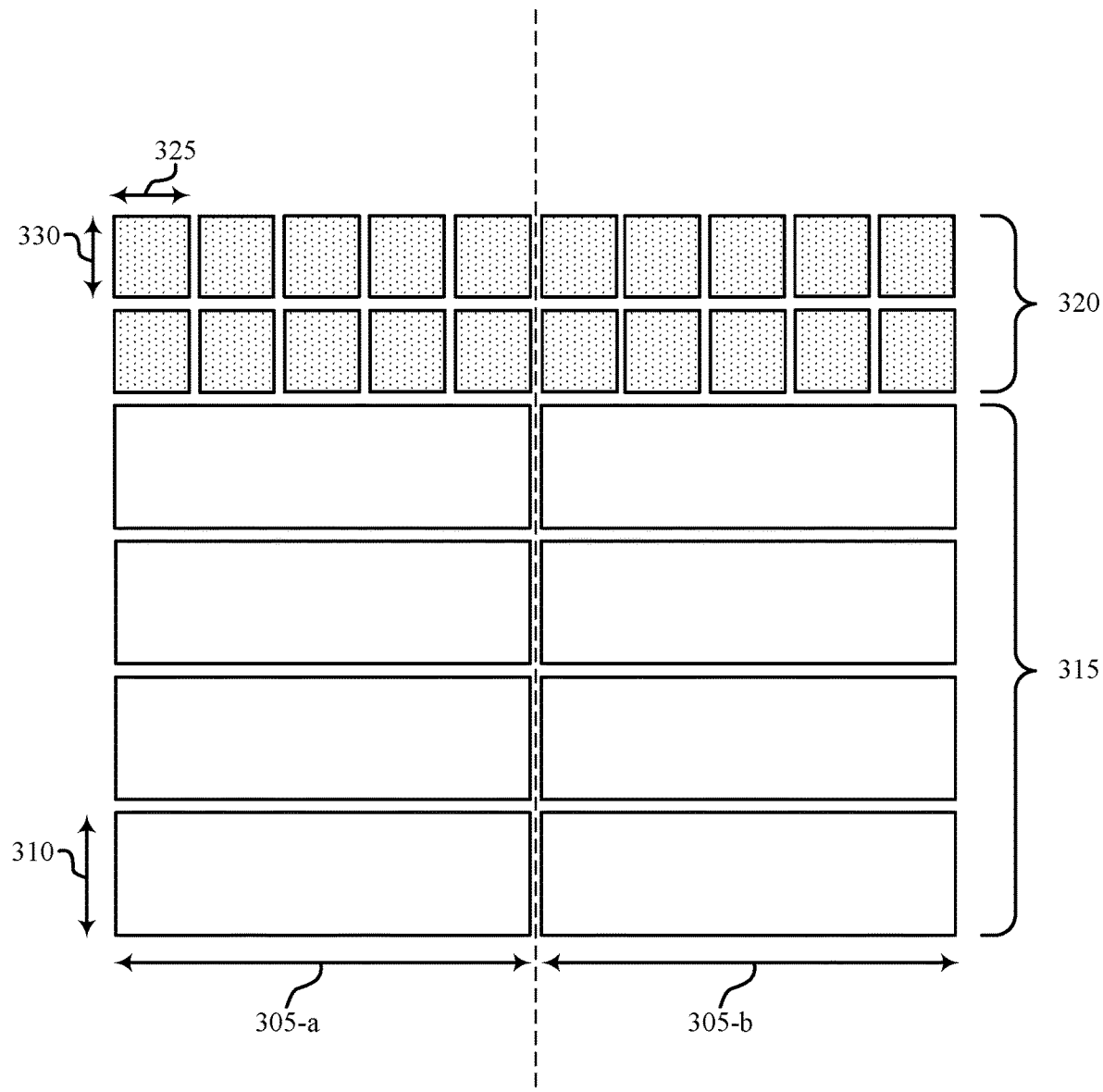
FIG. 3 illustrates an example of a sidelink resource configuration that supports dynamic time division duplexing for enhanced sidelink control signaling in accordance with aspects of the present disclosure.

FIG. 3 illustrates an example of a sidelink resource configuration 300 that supports dynamic time division duplexing for enhanced sidelink control signaling in accordance with aspects of the present disclosure. For example, the sidelink resource configuration 300 may be implemented by wireless communications systems 100 and 200 described with reference to FIGS. 1 and 2. Wireless devices such as base stations, S/As, and PLCs (e.g., which may be examples of base stations 105 and UEs 115 described with reference to FIGS. 1 and 2) may perform communications in accordance with sidelink resource configuration 300.

Sidelink resource configuration 300 illustrates a set of sidelink resources which include sidelink resources in a first slot 305-a and a second slot 305-a in the time domain. Additionally, the sidelink resource configuration 300 may span a quantity of subchannels 310 (or other group of frequency resources) in the frequency domain. The set of sidelink resource configuration 300 may include a set of sidelink resources associated with a sidelink communication link between wireless devices of a sidelink network.

In some aspects, the sidelink resource configuration 300 may include a first portion of sidelink resources 315 and a second portion of sidelink resources 320. The first portion of sidelink resources 315 may include PSSCH resources, PSCCH resources, or both. Accordingly, the first portion of sidelink resources 315 may include resources of a sidelink communication link which may be used for transmission of SCI (e.g., SCI-1, SCI-2) during at least a portion of a slot.

The second portion of sidelink resources 320 may include a set of dedicated sidelink resources 320. For example, as described previously herein, a wireless device (e.g., a base station or a PLC) may reserve or otherwise indicate a set of sidelink resources (e.g., the second portion of sidelink resources 320) of a sidelink communication link which are dedicated for transmission of S-UCI and S-DCI in accordance with a TDD configuration. In this example, the set of dedicated sidelink resources 320 may include dedicated pool of sidelink resources (e.g., a subset of the sidelink resource configuration 300) which are reserved for transmission/reception of S-UCI and/or S-DCI. In such examples, the dedicated sidelink resources 320 may be used for information associated with sidelink coordination, HARQ data, CSI-reports, scheduling requests (e.g., sidelink scheduling requests), SFIs, etc.

The set of dedicated sidelink resources 320 which are dedicated for transmission or reception of S-UCI and S-DCI may be multiplexed (e.g., FDM) with the first set of sidelink resources 315. For example, in some cases, wireless devices (e.g., UEs, S/As, PLCs) may not be configured or expected to utilize the last $N_{PRB}$ mode $n_{subCHsize}$ PRBs within the sidelink resource configuration 300. In this example, the unused PRBs of the sidelink resource configuration 300 may include set of dedicated sidelink resources 320 which are reserved for transmission/reception of S-UCI and/or S-DCI.

In some cases, the set of dedicated sidelink resources 320 may span up to the size of a subchannel 310 in the frequency domain. In addition, the set of dedicated sidelink resources 320 may be sub-divided up in the time domain into time units 325 which include mini-slots, symbols, or both. Further, the set of dedicated sidelink resources 320 may be sub-divided up in the frequency domain into frequency units 330 which include resource blocks, resource elements, resource element groups, and/or control channel elements. This finer granularity within the set of dedicated sidelink resources 320 may allow for improved flexibility of sidelink signaling (e.g., control signaling) within the sidelink network. For example, the sidelink resource configuration 300 may provide flexible sidelink control information payload sizes and formats (e.g., long and short sidelink control information formats for different payload sizes), and may allow for repetition or aggregation of sidelink control information for coverage enhancement. Additionally, the dedicated sidelink resources 320 may be used for HARQ feedback transmissions for sidelink (e.g., ACK/NACK), for CSI-reporting, or inter-UE coordination messages.

In some examples, control signaling (e.g., RRC signaling) from a base station 105 or PLC of a wireless communications system may be used to reserve or otherwise indicate a set of dedicated sidelink resources 320 which are dedicated for transmission of S-UCI and S-DCI (e.g., for contention based access to the dedicated sidelink resources 320).

The sidelink resource configuration 300 may support techniques for sidelink control signaling. In particular, the sidelink resource configuration 300 may support techniques for scheduling of sidelink transmissions (e.g., control information) via sidelink communication links in the absence of sidelink data transmissions, and for enhanced TDD communications between wireless devices.

Figure 4:
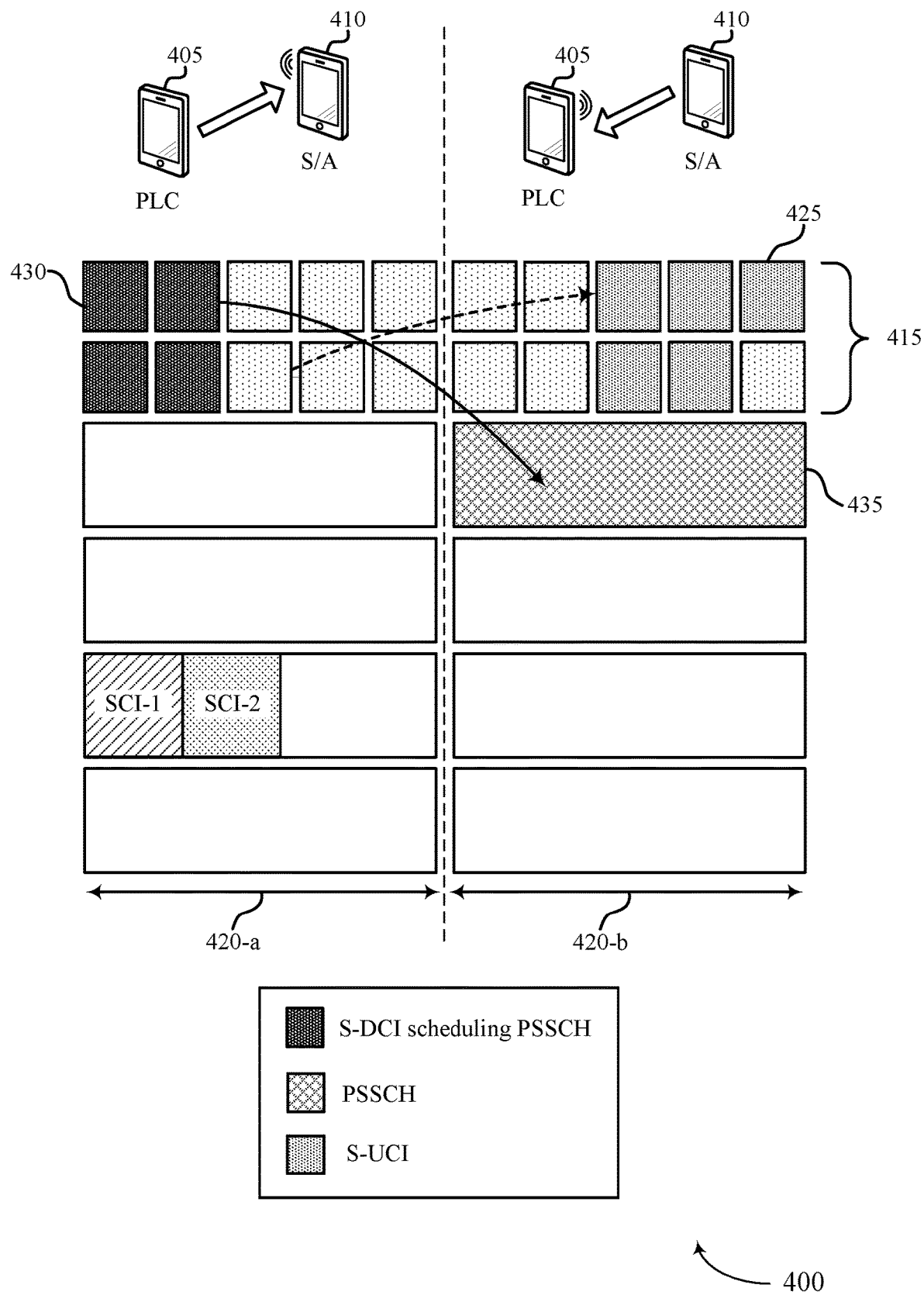
FIG. 4 illustrates an example of a sidelink resource configuration that supports dynamic time division duplexing for enhanced sidelink control signaling in accordance with aspects of the present disclosure.

FIG. 4 illustrates an example of a sidelink resource configuration 400 that supports dynamic time division duplexing for enhanced sidelink control signaling in accordance with aspects of the present disclosure. For example, the sidelink resource configuration 400 may be implemented by wireless communications systems 100 and 200 described with reference to FIGS. 1 and 2, and may be an example of sidelink resource configuration 300 described with reference to FIG. 3. Wireless devices such as base stations, S/As, and PLCs (e.g., which may be examples of base stations 105 and UEs 115 described with reference to FIGS. 1 and 2) may perform communications in accordance with sidelink resource configuration 400.

In some examples, a base station may transmit a control message indicating a set of resources to be used for a sidelink communication link between one or more sets of devices in a wireless network, for example, between a PLC and one or more S/As. In some examples, the control message may include an allocation of resources such as sidelink resource configuration 400 (e.g., time resources, frequency resources, spatial resources) associated with a sidelink communication link which may be used by a first wireless device, a second wireless device, or both. The control message may include an RRC message, a downlink control information (DCI) message, a synchronization signal block (SSB), or any combination thereof.

In some cases, the control message may indicate a set of sidelink resources of the sidelink communication link which are dedicated for transmission of S-UCI and S-DCI (e.g., "dedicated sidelink resources"). In this example, the control message may indicate a dedicated pool of sidelink resources 415 for transmission and reception of S-UCI and/or S-DCI. Thus, the set of sidelink resources may be dedicated for information associated with sidelink coordination, HARQ data, CSI-reports, scheduling requests (e.g., sidelink scheduling requests), and slot format indicators (SFIs).

In additional or alternative aspects, the control message may indicate a first portion of sidelink resources (e.g., SCI-1) and a second set of sidelink resources (e.g., SCI-2). In some examples, the first portion of sidelink resources (e.g., SCI-1) may include information associated with the uplink transmission including, but not limited to, sidelink resources for performing the uplink transmission, CSI reporting information, a configuration for transmitting the uplink transmission (e.g., periodically, aperiodically, semi-persistently), a time interval for transmitting the uplink transmission, a format for the uplink transmission, or any combination thereof. The second portion of sidelink resources (e.g., SCI-2) may include an indication of a set of sidelink resources which is to be used to transmit the uplink transmission. In some aspects, the indication of the set of sidelink resources may be included within the SCI within one or more bit fields associated with an allocation of time resources (e.g., time domain resource assignment (TDRA) bit fields), within one or more bit fields associated with an allocation of frequency resources (e.g., frequency domain resource assignment (FDRA) fields), or both.

In additional or alternative cases, the control message may indicate a TDD configuration associated with the sidelink transmissions between the first wireless device 405 and the second wireless device 410. In such cases, uplink transmissions (e.g., UCI, S-UCI, uplink data messages) and downlink transmissions (e.g., DCI, S-DCI, downlink data messages) may share the same frequency spectrum and are separated in the time domain. Accordingly, such a TDD configuration may support a single wireless device transmitting during a first slot 425-a (e.g., first wireless device 405 may be in a transmission mode) while another device listens during the first slot 420-a (e.g., second wireless device 410 may be in a receiving mode). In addition, during the second slot 420-b, the first wireless device 405 may switch to a receiving mode, while the second wireless device 410 may be in a transmitting mode.

In some examples, the first wireless device 405 may use S-DCI to indicate that it has a downlink packet to send to the second wireless device 410 during the second slot 420-b, or the first wireless device 405 may use S-DCI 430 to schedule an uplink transmission (e.g., S-UCI on the PSCCH 435) from the second wireless device 410 during the second slot 420-b. In such cases, the first wireless device 405 and the second wireless device 410 may coordinate sidelink transmissions in order to support the TDD configuration for the sidelink communications. For example, the first wireless device 405 and the second wireless device 410 may coordinate such that the transmission of S-DCI by the first wireless device 405 in the first slot 420-a occurs while the first wireless device 405 is in a transmission mode and the second wireless device 410 is in a reception mode, and that the transmission of S-UCI by the second wireless device 410 in the second slot 420-b occurs while the second wireless device 410 is in a transmission mode and the first wireless device 405 is in a reception mode. Stated alternatively, the first wireless device 405 and the second wireless device 410 may operate in opposite modes (e.g., transmission and reception modes) for a given slot in accordance with the TDD configuration.

In some other examples, the first wireless device 405 (e.g., a PLC) may coordinate the transmission of the uplink transmission (e.g., S-UCI) by the second wireless device 410 (e.g., an S/A) during a given slot. For example, the first wireless device 405 may transmit S-DCI 430 (or any other downlink transmission) during the first slot 420-a to schedule transmission of the S-UCI (or any other uplink transmission) by the second wireless device 410 during the second slot 420-b. Upon scheduling the second wireless device 410 to transmit the uplink transmission during the second slot 425-b the first wireless device 405 may ensure that it is in a receiving mode during the second slot 425-a to receive the uplink transmission. In such cases, the first wireless device 405 may switch operating modes (e.g., between transmission and reception modes) in order to accommodate the transmissions it schedules for the second wireless device 410. For example, once scheduling an uplink transmission for the second wireless device during the second slot 420-b, the first wireless device 405 may switch from a transmitting mode in the first slot 420-a to a receiving mode in the second slot 420-b.

Further, the first wireless device 405 may determine the time-domain resource assignment for the S-UCI, which may be in a portion of logical sidelink slots 415 (e.g., the first wireless device 405 may ensure that the TDD pattern of the transmission supports the S-UCI transmission from the second wireless device 410). For example, the time-domain resource scheduling of the uplink control information may be based on absolute time offset between the transmitting the S-DCI and receiving the S-UCI. In some examples, the second wireless device 410 is transparent to the scheduling of the first wireless device 405 (e.g., the second wireless device 410 is not aware of the scheduling of the S-UCI, but follows the resource allocation indicated by first wireless device 405).

In some other examples, the second wireless device 410 (e.g., an S/A) may support applying a scheduling (or modifying a scheduling) of the uplink transmission (e.g., S-UCI) during a given slot. For example, the second wireless device 410 may apply a scheduling by transmitting the S-UCI in accordance with the scheduling, or in some cases refraining from transmitting the S-UCI in accordance with the scheduling. In some cases, the second wireless device may detect a sidelink control information transmission (e.g., SCI-1 or SCI-2) by the first wireless device 405 the first slot 420-a, and may use information provided in the sidelink control information to infer the communication mode (e.g., transmission or reception) of the first wireless device in the first slot 420-a. For example, the second wireless device 410 may implicitly assume that the first wireless device 405 is in a transmission mode in the first slot 420-a based on receiving the sidelink control information from the first wireless device 405, and the second wireless device 410 may modify a scheduling (e.g., drop or delay) the transmission of S-UCI to accommodate the first wireless device 405 transmitting during the first slot 420-a. In such cases, the time domain resource assignment of sidelink control information may be associated with the TDD pattern of the first wireless device 405, the second wireless device 410, or both.

In some examples, the second wireless device 410 may receive a transmitter identifier (e.g., a Tx-ID) in SCI-2 transmitted from the first wireless device 405. Based on decoding the SCI-2, the second wireless device 410 may determine that the first wireless device 405 is transmitting during the first slot 420-a. For example, if the second wireless device 410 determines that the decoded transmitter identifier in SCI-2 matches the transmitter identifier for the first wireless device 405, the second wireless device may apply a scheduling for the S-UCI (e.g., applying the scheduling may refer to transmitting the S-UCI in accordance with the scheduling, or refraining from transmitting the S-UCI in accordance with the scheduling) which accommodates the operating mode of the first wireless device 405 during the first slot 420-a. In such cases where the first wireless device 405 is transmitting in the first slot 420-a, the second wireless device 410 may drop or delay the transmission of S-UCI in accordance with the transmission mode of the first wireless device 405.

In some other examples, the second wireless device 410 may receive an indication in SCI-1 which indicates the operating mode of the first wireless device 405 in the first slot 420-a. For example, the second wireless device 410 may receive a one-bit indicator in SCI-1 which indicates the operating mode of the first wireless device 405 or the second wireless device 410 during the first slot 420-a. For cases in which the second wireless device 410 determines that the first wireless device 405 is operating in a transmitting mode in the first slot 420-a in accordance with the one-bit indicator, the second wireless device 410 may drop or delay the transmission of S-UCI to the second slot 420-b. In some other cases in which the second wireless device 410 determines that the first wireless device 405 is operating in a receiving mode in the first slot 420-a in accordance with the one-bit indicator, the second wireless device 410 may transmit the S-UCI in the first slot 420-a.

In some other examples, the second wireless device may receive SCI-1 during the first slot 420-a which includes a CRC scrambling sequence which allows the second wireless device 410 to determine the operating mode of the first wireless device 405 during the first slot. For example, the CRC scrambling sequence may specifically notify the second wireless device 410 that the first wireless device is in a transmitting mode during the first slot 420-a. Based on the CRC scrambling sequence of SCI-1, the second wireless device 410 may determine whether to drop or delay the transmission of the S-UCI in the first slot 420-a. In cases where the second wireless device 410 determines that the first wireless device 405 is in a transmitting mode during the first slot in accordance with the CRC scrambling sequence, the second wireless device 410 may drop the transmission of the S-UCI in the first slot 420-a, or the second wireless device 410 may delay the transmission of the S-UCI to the second slot 420-b. In cases where the second wireless device 410 determines that the first wireless device 405 is in a receiving mode during the first slot in accordance with the CRC scrambling sequence, the second wireless device 410 may transmit the S-UCI in the first slot 420-a.

By coordinating the transmission and reception of the S-UCI in accordance with the TDD configuration of the sidelink communications, the first wireless device 405 and the second wireless device 410 may increase communications reliability and reduce latency for sidelink transmissions, and may reduce scheduling and transmission conflicts between devices in the network.

Figure 5:
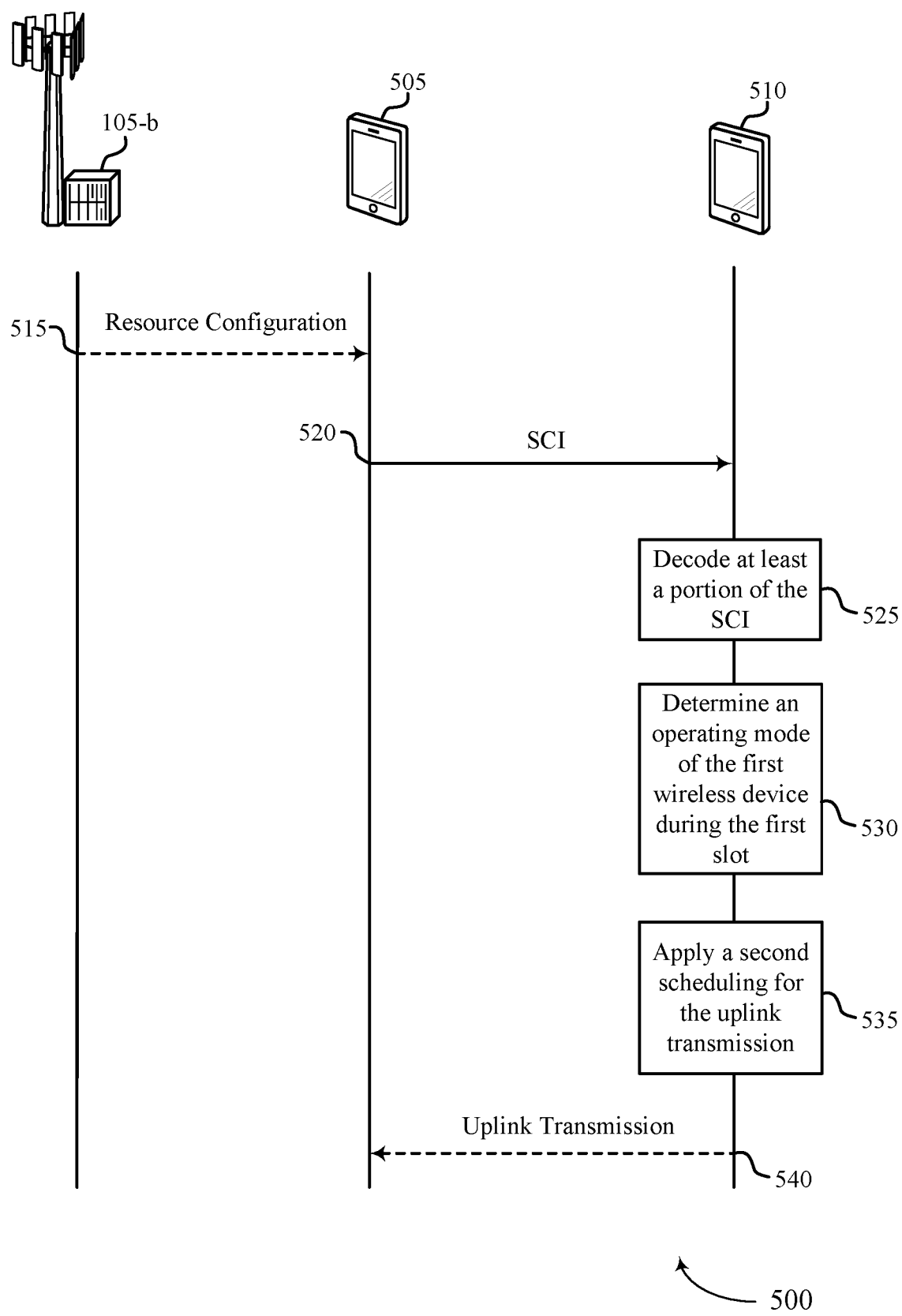
FIG. 5 illustrates an example of a process flow that supports dynamic time division duplexing for enhanced sidelink control signaling in accordance with aspects of the present disclosure.

FIG. 5 illustrates an example of a process flow 500 that supports dynamic time division duplexing for enhanced sidelink control signaling in accordance with aspects of the present disclosure. The process flow 500 includes a base station 105-b, a first wireless device 505, and a second wireless device 510. In some examples, the first wireless device 505 may be a UE 115 described with reference to FIG. 1, or a PLC described with reference to FIGS. 2-4. In some examples, the second wireless device 510 may be a UE 115 described with reference to FIG. 1, or an S/A described with reference to FIGS. 2-4. Alternative examples of the following may be implemented, where some steps are performed in a different order than described or are not performed at all. In some cases, steps may include additional features not mentioned below, or further steps may be added. In addition, while process flow 500 shows processes between a base station 105-b and two wireless devices 505 and 510, it should be understood that these processes may occur between any number of network devices.

At 515, the first wireless device 505 may receive a sidelink resource configuration from the base station 105-b. In some examples, the sidelink resource configuration may include time resources, frequency resources, or spatial resources associated with a sidelink communication link which may be used by the first wireless device 505, the second wireless device 510, or both. The sidelink resource configuration may be a control message such as an RRC message, a DCI message, an SSB message, or any combination thereof.

At 520, the first wireless device 505 may transmit, and the second wireless device 510 may receive, via a sidelink communication link, sidelink control information including a first scheduling for an uplink transmission (e.g., an uplink control information message, an uplink data message, or both) from the second wireless device to the first wireless device during a first slot.

At 525, the second wireless device 510 may decode at least a portion of the sidelink control information, where the sidelink control information includes an indication of an operating mode of the first wireless device 505 in the first slot. At 530, the second wireless device 510 may determine the operating mode of the first wireless device 505 in the first slot based on the operating mode indication. For example, the operating mode of the first wireless device 505 may be a transmitting mode (e.g., the first wireless device 505 may be configured to transmit downlink messages to the second wireless device 510 during the first slot) or a receiving mode (e.g., the first wireless device 505 may be configured to receive uplink messages from the second wireless device 510 during the first slot).

At 535, based on the sidelink control information and the determination of the operating mode of the first wireless device 505 in the first slot, the second wireless device 510 may apply a second scheduling for the uplink transmission different from the first scheduling, the second scheduling based on the operating mode of the first wireless device 505 in the first slot. For example, applying the second scheduling may include implementing the second scheduling in addition to the first scheduling, or instead of the first scheduling based on the operating mode of the first wireless device 505. As described in further detail herein, the second scheduling may instruct the second wireless device 510 to refrain from transmitting the uplink transmission (e.g., applying the second scheduling may include refraining from transmitting the uplink transmission).

In some examples, the indication of the operating mode is a transmitter identifier associated with the first wireless device 505 received in a second portion of the sidelink control information. In some examples, the indication of the operating mode is a one-bit indication of the operating mode of the first wireless device 505 or the second wireless device 510 received in a first portion of the sidelink control information. In yet other examples, the indication of the operating mode comprises a CRC scrambling sequence associated with the first wireless device 505 or the second wireless device 510 received in a first portion of the sidelink control information.

In some examples, applying the second scheduling may include dropping (e.g., refraining from transmitting) the uplink transmission in the first slot based on the first wireless device 505 operating in a transmitting mode during the first slot. In such cases, the second wireless device 510 may transmit an indication of the dropping of the uplink transmission to the first wireless device 505. In some cases, the indication of the dropping of the uplink transmission may include a scheduling request, such that the first wireless device 505 may identify the dropping based on the indication, and may reschedule the uplink transmission accordingly (e.g., the first wireless device 505 may determine a different slot in which to schedule the uplink transmission for the first second wireless device 510). In some cases, the second wireless device 510 may receive the rescheduling of the uplink transmission in a second slot based on the dropping of the uplink transmission in the first slot.

In some examples, the first wireless device 505 may be in a transmitting mode during the first slot and the second wireless device 510 may be in a receiving mode, and the second wireless device 510 may receive a DCI from the first wireless device 505 during the first slot in accordance with the receiving mode. In some examples, the DCI may schedule an uplink transmission from the second wireless device 510 to the first wireless device 505 during a second slot (e.g., the uplink transmission may be delayed from the first slot to the second slot in accordance with the operating mode).

At 540, the second wireless device 510 may perform the uplink transmission using the set of sidelink resources in accordance with the second scheduling. In some other examples, the second wireless device 510 may refrain from performing the uplink transmission in accordance with the second scheduling. In some examples, scheduling of the uplink transmission may be based on a time offset between receiving the sidelink control information and transmitting the uplink transmission.

Figure 6:
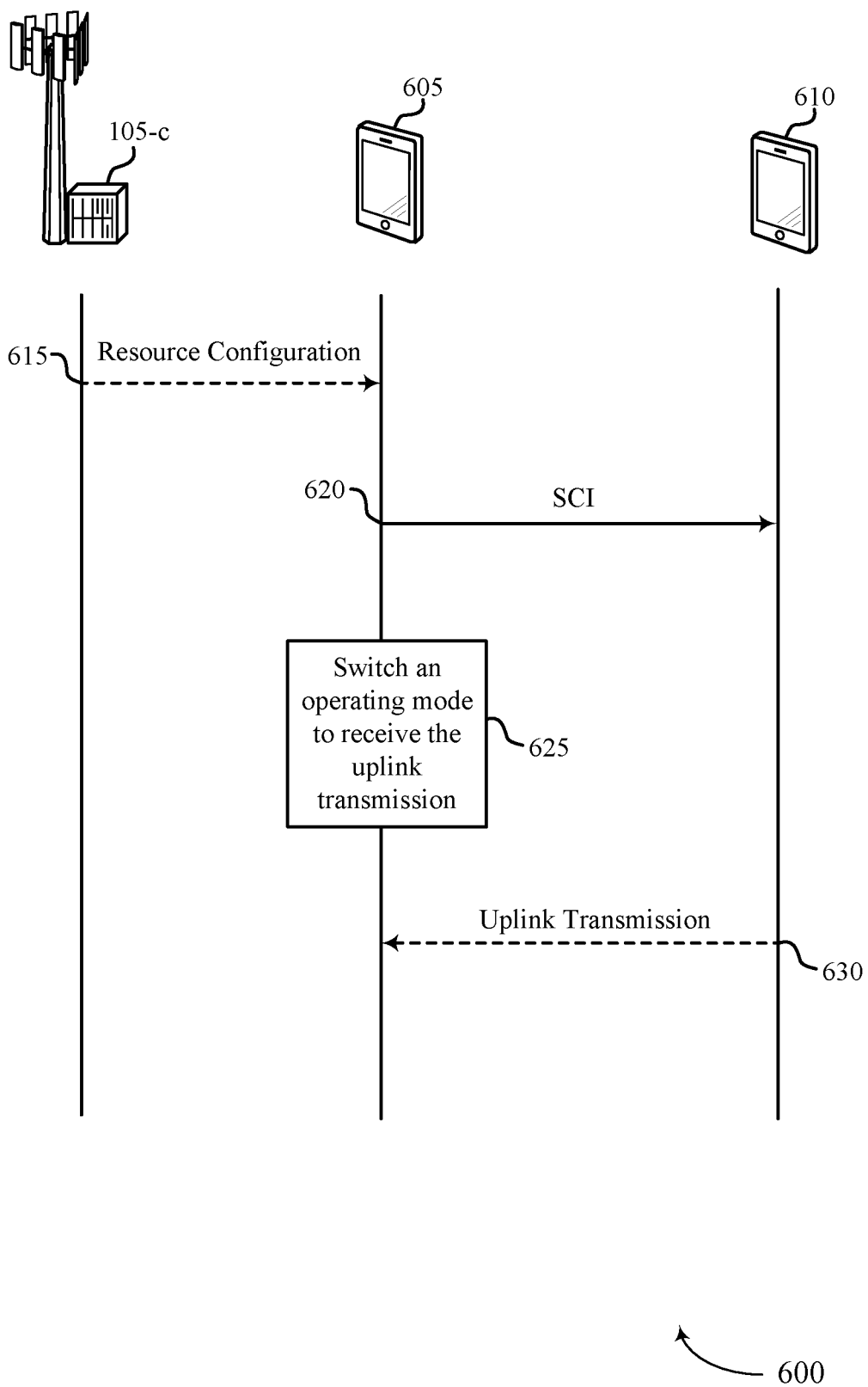
FIG. 6 illustrates an example of a process flow that supports dynamic time division duplexing for enhanced sidelink control signaling in accordance with aspects of the present disclosure.

FIG. 6 illustrates an example of a process flow 600 that supports dynamic time division duplexing for enhanced sidelink control signaling in accordance with aspects of the present disclosure. The process flow 600 includes a base station 105-c, a first wireless device 605, and a second wireless device 610. In some examples, the first wireless device 605 may be a UE 115 described with reference to FIG. 1 or a PLC described with reference to FIGS. 2-5. In some examples, the second wireless device 610 may be a UE 115 described with reference to FIG. 1 or an S/A described with reference to FIGS. 2-5. Alternative examples of the following may be implemented, where some steps are performed in a different order than described or are not performed at all. In some cases, steps may include additional features not mentioned below, or further steps may be added. In addition, while process flow 600 shows processes between a base station 105-c and two wireless devices 605 and 610, it should be understood that these processes may occur between any number of network devices.

At 615, the first wireless device 605 may receive a sidelink resource configuration from the base station 105-c. In some examples, the sidelink resource configuration may include time resources, frequency resources, or spatial resources associated with a sidelink communication link which may be used by the first wireless device 605, the second wireless device 610, or both. The sidelink resource configuration may be a control message such as an RRC message, a DCI message, an SSB message, or any combination thereof.

At 620, the first wireless device 605 may transmit, to a second wireless device 610 and via a sidelink communication link in a first slot, sidelink control information including a scheduling for an uplink transmission (e.g., an uplink control information message, an uplink data message, or both) from the second wireless device 610 to the first wireless device 605 during a second slot.

At 625, the first wireless device 605 may switch operating modes to receive the uplink transmission in the second slot in accordance with the scheduling. For example, the first wireless device 605 may switch from a transmitting mode in the first slot to a receiving mode in the second slot to receive the uplink transmission from the second wireless device 610 in the second slot. In such examples, the first wireless device 605 may ensure that it is in a receiving mode to accommodate the scheduling of the transmission of uplink control information by the second wireless device 610.

At 630, the second wireless device 610 may perform, and the first wireless device 605 may receive, the uplink transmission in accordance with the scheduling using a subset of the sidelink resources indicated by the sidelink resource configuration.

Figure 7:
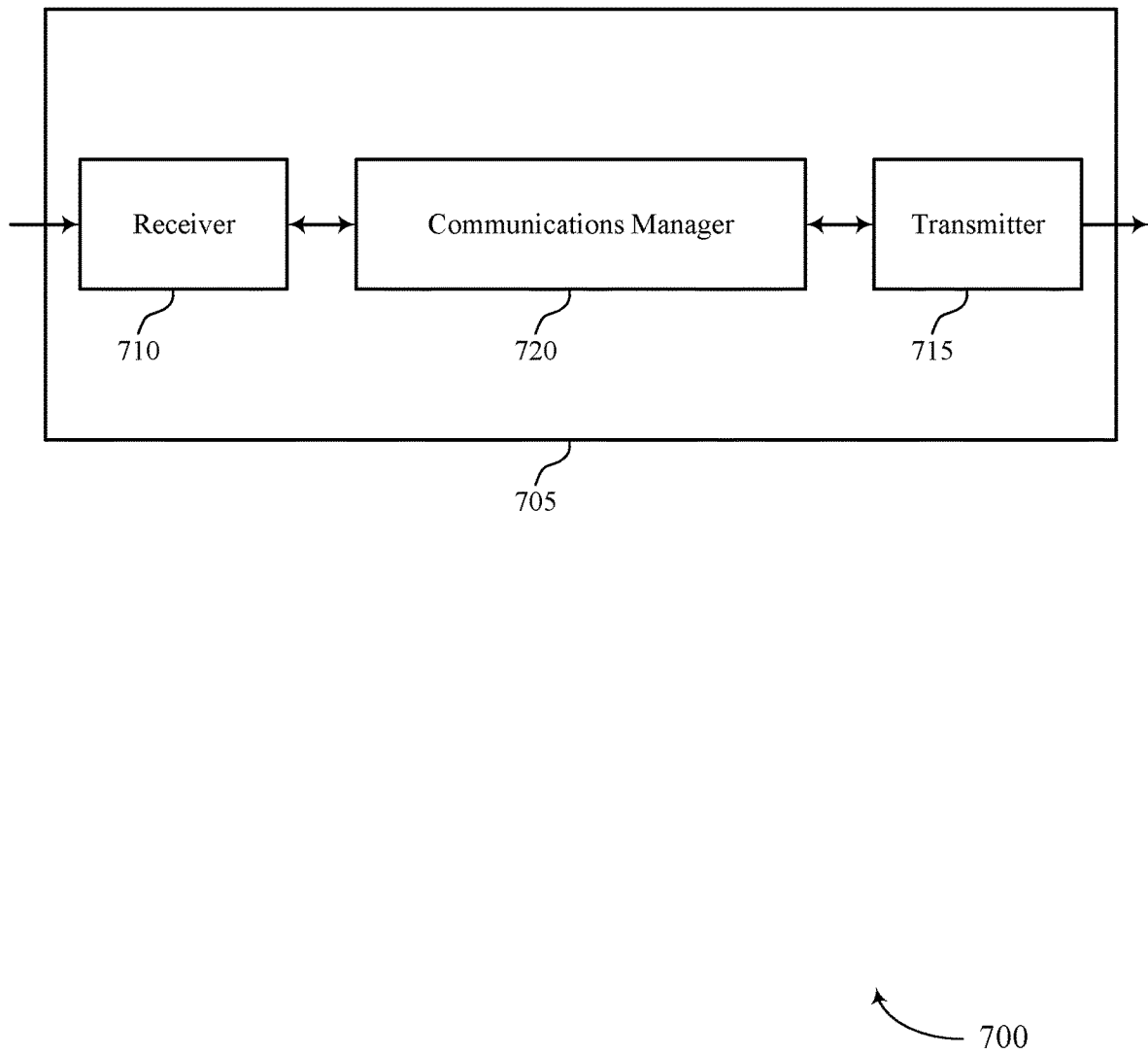
FIGS. 7 and 8 show block diagrams of devices that support dynamic time division duplexing for enhanced sidelink control signaling in accordance with aspects of the present disclosure.

FIG. 7 shows a block diagram 700 of a device 705 that supports dynamic time division duplexing for enhanced sidelink control signaling in accordance with aspects of the present disclosure. The device 705 may be an example of aspects of a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to dynamic time division duplexing for enhanced sidelink control signaling). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to dynamic time division duplexing for enhanced sidelink control signaling). In some examples, the transmitter 715 may be co-located with a receiver 710 in a transceiver module. The transmitter 715 may utilize a single antenna or a set of multiple antennas.

The communications manager 720, the receiver 710, the transmitter 715, or various combinations thereof or various components thereof may be examples of means for performing various aspects of dynamic time division duplexing for enhanced sidelink control signaling as described herein. For example, the communications manager 720, the receiver 710, the transmitter 715, or various combinations or components thereof may support a method for performing one or more of the functions described herein.

In some examples, the communications manager 720, the receiver 710, the transmitter 715, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 720, the receiver 710, the transmitter 715, or various combinations or components thereof may be implemented in code (e.g., as communications management software or firmware) executed by a processor. If implemented in code executed by a processor, the functions of the communications manager 720, the receiver 710, the transmitter 715, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 720 may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communications at a first wireless device in accordance with examples as disclosed herein. For example, the communications manager 720 may be configured as or otherwise support a means for receiving, from a second wireless device and via a sidelink communication link, sidelink control information including a first scheduling for an uplink transmission from the first wireless device to the second wireless device during a first slot. The communications manager 720 may be configured as or otherwise support a means for decoding at least a portion of the sidelink control information, the sidelink control information including an indication of an operating mode of the second wireless device in the first slot. The communications manager 720 may be configured as or otherwise support a means for applying a second scheduling for the uplink transmission different from the first scheduling, the second scheduling based on the operating mode of the second wireless device in the first slot.

By including or configuring the communications manager 720 in accordance with examples as described herein, the device 705 (e.g., a processor controlling or otherwise coupled to the receiver 710, the transmitter 715, the communications manager 720, or a combination thereof) may support techniques for reduced power consumption, more efficient utilization of communication resources, and reduced retransmission instances due to scheduling collisions.

Figure 8:
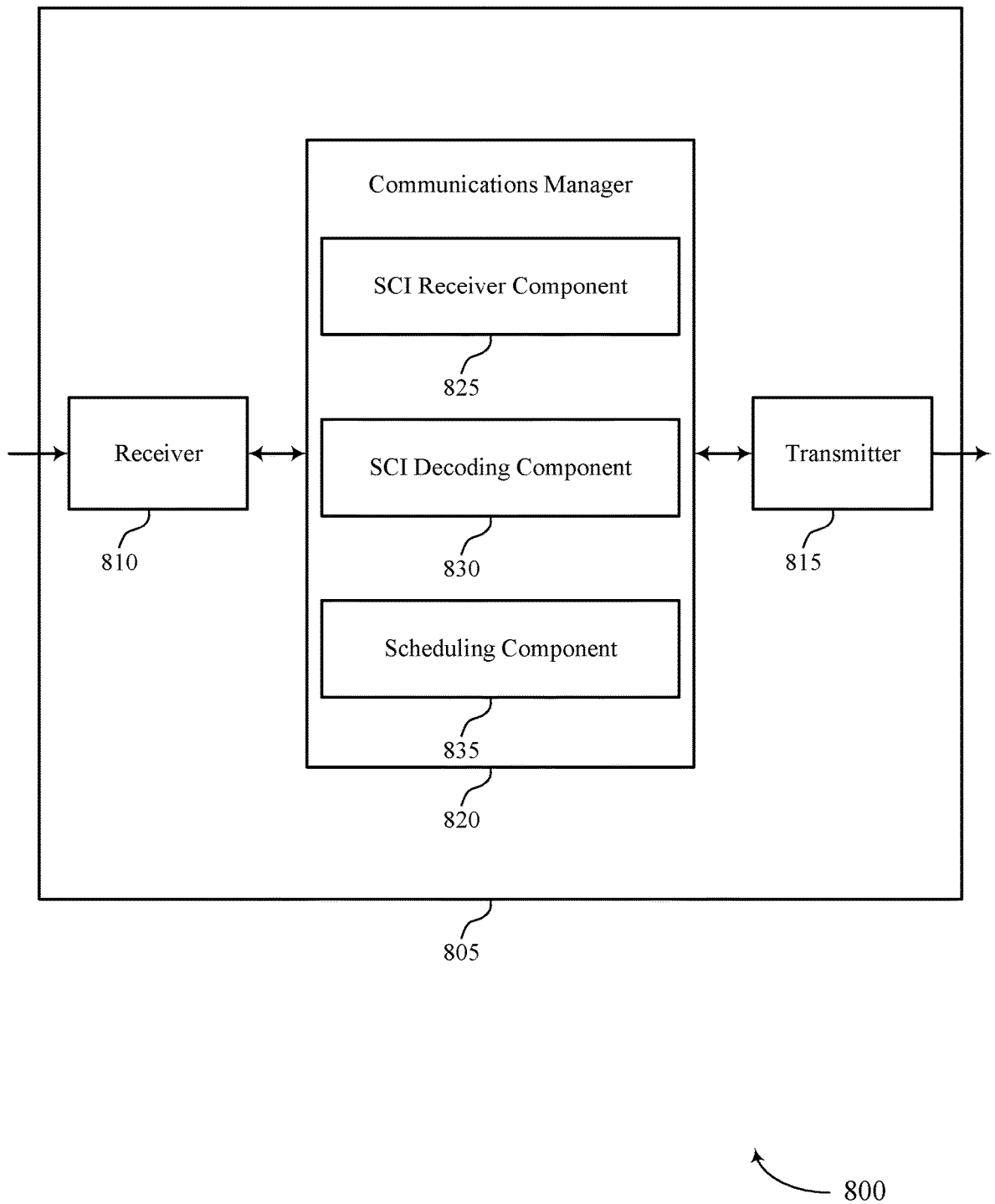

FIG. 8 shows a block diagram 800 of a device 805 that supports dynamic time division duplexing for enhanced sidelink control signaling in accordance with aspects of the present disclosure. The device 805 may be an example of aspects of a device 705 or a UE 115 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to dynamic time division duplexing for enhanced sidelink control signaling). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to dynamic time division duplexing for enhanced sidelink control signaling). In some examples, the transmitter 815 may be co-located with a receiver 810 in a transceiver module. The transmitter 815 may utilize a single antenna or a set of multiple antennas.

The device 805, or various components thereof, may be an example of means for performing various aspects of dynamic time division duplexing for enhanced sidelink control signaling as described herein. For example, the communications manager 820 may include an SCI receiver component 825, an SCI decoding component 830, a scheduling component 835, or any combination thereof. The communications manager 820 may be an example of aspects of a communications manager 720 as described herein. In some examples, the communications manager 820, or various components thereof, may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communications at a first wireless device in accordance with examples as disclosed herein. The SCI receiver component 825 may be configured as or otherwise support a means for receiving, from a second wireless device and via a sidelink communication link, sidelink control information including a first scheduling for an uplink transmission from the first wireless device to the second wireless device during a first slot. The SCI decoding component 830 may be configured as or otherwise support a means for decoding at least a portion of the sidelink control information, the sidelink control information including an indication of an operating mode of the second wireless device in the first slot. The scheduling component 835 may be configured as or otherwise support a means for applying a second scheduling for the uplink transmission different from the first scheduling, the second scheduling based on the operating mode of the second wireless device in the first slot.

Figure 9:
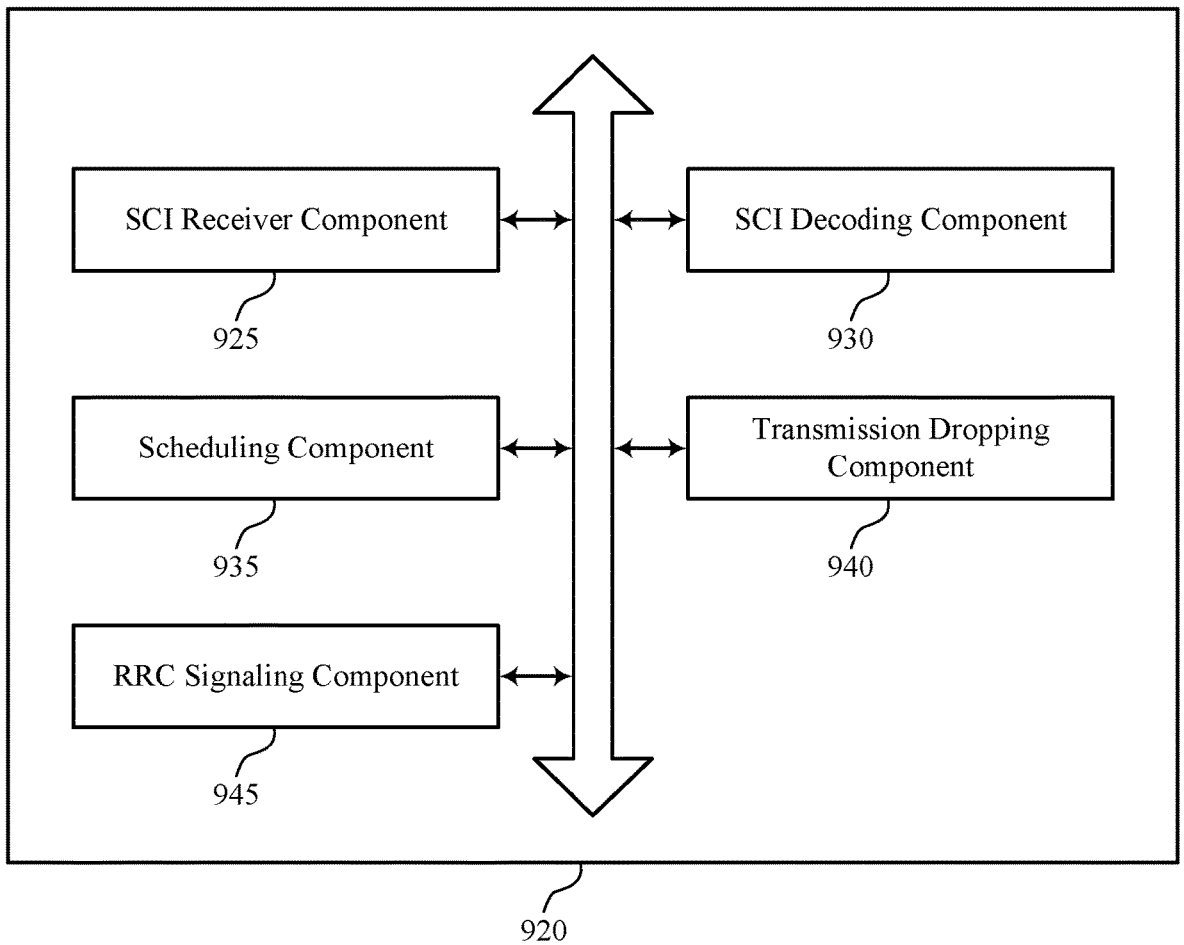
FIG. 9 shows a block diagram of a communications manager that supports dynamic time division duplexing for enhanced sidelink control signaling in accordance with aspects of the present disclosure.

FIG. 9 shows a block diagram 900 of a communications manager 920 that supports dynamic time division duplexing for enhanced sidelink control signaling in accordance with aspects of the present disclosure. The communications manager 920 may be an example of aspects of a communications manager 720, a communications manager 820, or both, as described herein. The communications manager 920, or various components thereof, may be an example of means for performing various aspects of dynamic time division duplexing for enhanced sidelink control signaling as described herein. For example, the communications manager 920 may include an SCI receiver component 925, an SCI decoding component 930, a scheduling component 935, a transmission dropping component 940, an RRC signaling component 945, or any combination thereof. Each of these components may communicate, directly or indirectly, with one another (e.g., via one or more buses).

The communications manager 920 may support wireless communications at a first wireless device in accordance with examples as disclosed herein. The SCI receiver component 925 may be configured as or otherwise support a means for receiving, from a second wireless device and via a sidelink communication link, sidelink control information including a first scheduling for an uplink transmission from the first wireless device to the second wireless device during a first slot. The SCI decoding component 930 may be configured as or otherwise support a means for decoding at least a portion of the sidelink control information, the sidelink control information including an indication of an operating mode of the second wireless device in the first slot. The scheduling component 935 may be configured as or otherwise support a means for applying a second scheduling for the uplink transmission different from the first scheduling, the second scheduling based on the operating mode of the second wireless device in the first slot.

In some examples, the scheduling component 935 may be configured as or otherwise support a means for determining an operating mode of the first wireless device during the first slot based on the sidelink control information, where applying the second scheduling of the uplink transmission is further based on the operating mode of the first wireless device in the first slot.

In some examples, to support applying the second scheduling of the uplink transmission, the scheduling component 935 may be configured as or otherwise support a means for delaying the uplink transmission from the first slot to a second slot based on the second wireless device operating in the transmitting mode during the first slot.

In some examples, to support applying the second scheduling of the uplink transmission, the transmission dropping component 940 may be configured as or otherwise support a means for dropping the uplink transmission in the first slot based on the second wireless device operating in the transmitting mode during the first slot. In some examples, to support applying the second scheduling of the uplink transmission, the transmission dropping component 940 may be configured as or otherwise support a means for transmitting, to the second wireless device, an indication of the dropping of the uplink transmission.

In some examples, the scheduling component 935 may be configured as or otherwise support a means for receiving, from the second wireless device, a rescheduling of the uplink transmission in a second slot based on the dropping of the uplink transmission in the first slot.

In some examples, to support applying the second scheduling of the uplink transmission, the scheduling component 935 may be configured as or otherwise support a means for receiving downlink control information from the second wireless device during the first slot in accordance with the receiving mode, the downlink control information scheduling the uplink transmission from the first wireless device to the second wireless device during a second slot.

In some examples, the indication of the operating mode includes a transmitter identifier associated with the second wireless device received in a second portion of the sidelink control information. In some examples, the indication of the operating mode includes a one-bit indication of the operating mode of the first wireless device or the second wireless device received in a first portion of the sidelink control information.

In some examples, the indication of the operating mode includes a cyclic redundancy check scrambling sequence associated with the first wireless device or the second wireless device received in a first portion of the sidelink control information. In some examples, scheduling the uplink transmission is based on a time offset between receiving the sidelink control information and transmitting the uplink transmission.

In some examples, the RRC signaling component 945 may be configured as or otherwise support a means for receiving a radio resource control message that indicates a set of sidelink resources of the sidelink communication link which are dedicated for transmission of uplink control information or reception of downlink control information, where the uplink transmission is transmitted via at least a subset of the set of sidelink resources. In some examples, the uplink transmission includes an uplink control information message, an uplink data message, or both.

Figure 10:
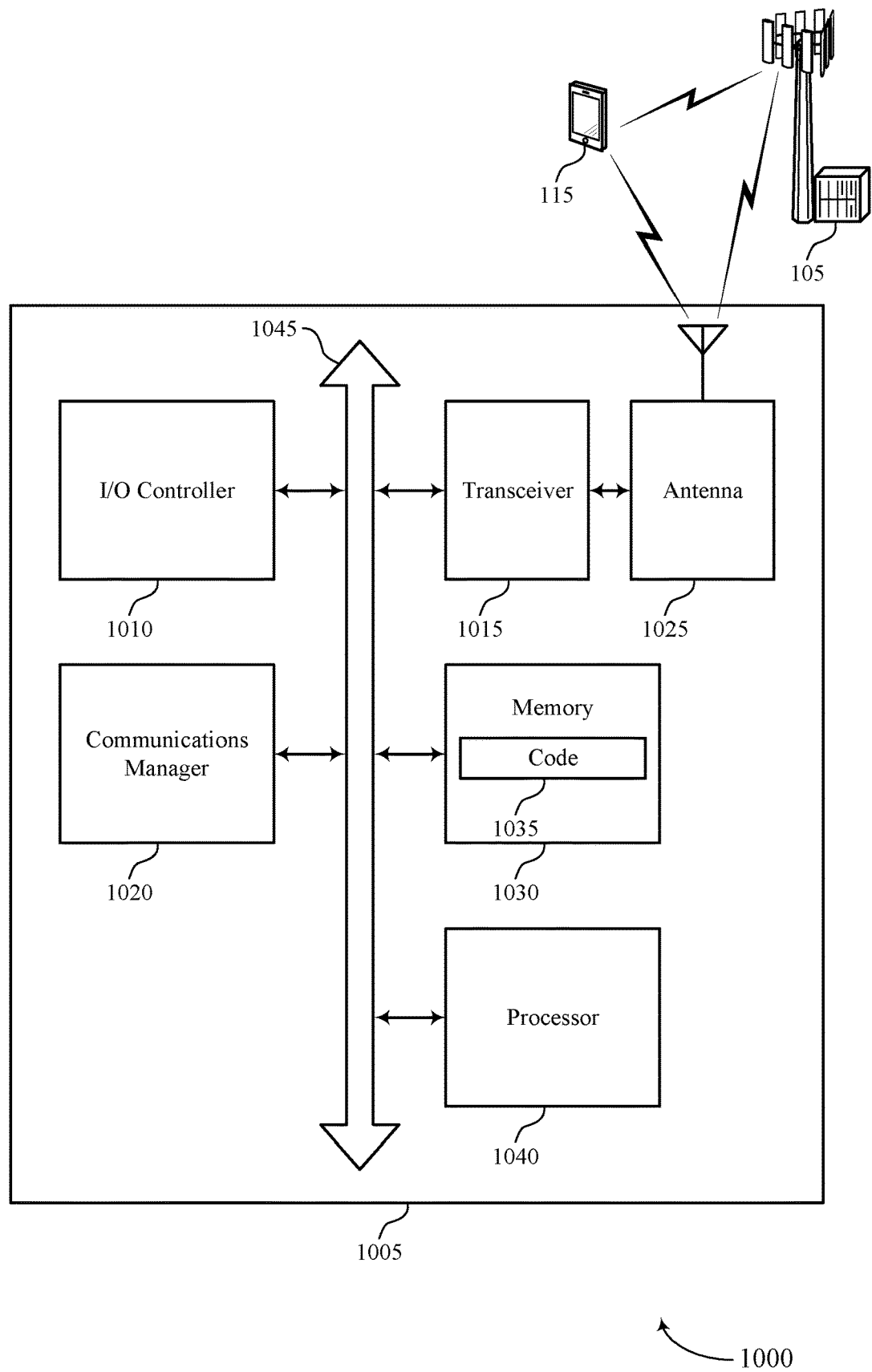
FIG. 10 shows a diagram of a system including a device that supports dynamic time division duplexing for enhanced sidelink control signaling in accordance with aspects of the present disclosure.

FIG. 10 shows a diagram of a system 1000 including a device 1005 that supports dynamic time division duplexing for enhanced sidelink control signaling in accordance with aspects of the present disclosure. The device 1005 may be an example of or include the components of a device 705, a device 805, or a UE 115 as described herein. The device 1005 may communicate wirelessly with one or more base stations 105, UEs 115, or any combination thereof. The device 1005 may include components for bi-directional voice and data communications including components for transmitting and receiving communications, such as a communications manager 1020, an input/output (I/O) controller 1010, a transceiver 1015, an antenna 1025, a memory 1030, code 1035, and a processor 1040. These components may be coupled (e.g., operatively, communicatively, functionally, electronically, electrically) via one or more buses (e.g., a bus 1045).

The I/O controller 1010 may manage input and output signals for the device 1005. The I/O controller 1010 may also manage peripherals not integrated into the device 1005. In some cases, the I/O controller 1010 may represent a physical connection or port to an external peripheral. In some cases, the I/O controller 1010 may utilize an operating system such as iOS®, ANDROID®, MS-DOS®, MS-WINDOWS®, OS/2®, UNIX®, LINUX®, or another known operating system. Additionally or alternatively, the I/O controller 1010 may represent or interact with a modem, a keyboard, a mouse, a touchscreen, or a similar device. In some cases, the I/O controller 1010 may be implemented as part of a processor, such as the processor 1040. In some cases, a user may interact with the device 1005 via the I/O controller 1010 or via hardware components controlled by the I/O controller 1010.

In some cases, the device 1005 may include a single antenna 1025. However, in some other cases, the device 1005 may have more than one antenna 1025, which may be capable of concurrently transmitting or receiving multiple wireless transmissions. The transceiver 1015 may communicate bi-directionally, via the one or more antennas 1025, wired, or wireless links as described herein. For example, the transceiver 1015 may represent a wireless transceiver and may communicate bi-directionally with another wireless transceiver. The transceiver 1015 may also include a modem to modulate the packets, to provide the modulated packets to one or more antennas 1025 for transmission, and to demodulate packets received from the one or more antennas 1025. The transceiver 1015, or the transceiver 1015 and one or more antennas 1025, may be an example of a transmitter 715, a transmitter 815, a receiver 710, a receiver 810, or any combination thereof or component thereof, as described herein.

The memory 1030 may include random access memory (RAM) and read-only memory (ROM). The memory 1030 may store computer-readable, computer-executable code 1035 including instructions that, when executed by the processor 1040, cause the device 1005 to perform various functions described herein. The code 1035 may be stored in a non-transitory computer-readable medium such as system memory or another type of memory. In some cases, the code 1035 may not be directly executable by the processor 1040 but may cause a computer (e.g., when compiled and executed) to perform functions described herein. In some cases, the memory 1030 may contain, among other things, a basic I/O system (BIOS) which may control basic hardware or software operation such as the interaction with peripheral components or devices.

The processor 1040 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In some other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting dynamic time division duplexing for enhanced sidelink control signaling). For example, the device 1005 or a component of the device 1005 may include a processor 1040 and memory 1030 coupled to the processor 1040, the processor 1040 and memory 1030 configured to perform various functions described herein.

The communications manager 1020 may support wireless communications at a first wireless device in accordance with examples as disclosed herein. For example, the communications manager 1020 may be configured as or otherwise support a means for receiving, from a second wireless device and via a sidelink communication link, sidelink control information including a first scheduling for an uplink transmission from the first wireless device to the second wireless device during a first slot. The communications manager 1020 may be configured as or otherwise support a means for decoding at least a portion of the sidelink control information, the sidelink control information including an indication of an operating mode of the second wireless device in the first slot. The communications manager 1020 may be configured as or otherwise support a means for applying a second scheduling for the uplink transmission different from the first scheduling, the second scheduling based on the operating mode of the second wireless device in the first slot.

By including or configuring the communications manager 1020 in accordance with examples as described herein, the device 1005 may support techniques for improved communication reliability, reduced latency, improved user experience related to reduced scheduling collisions, more efficient utilization of communication resources, and improved coordination between devices operating in accordance with a TDD transmission configuration.

In some examples, the communications manager 1020 may be configured to perform various operations (e.g., receiving, monitoring, transmitting) using or otherwise in cooperation with the transceiver 1015, the one or more antennas 1025, or any combination thereof. Although the communications manager 1020 is illustrated as a separate component, in some examples, one or more functions described with reference to the communications manager 1020 may be supported by or performed by the processor 1040, the memory 1030, the code 1035, or any combination thereof. For example, the code 1035 may include instructions executable by the processor 1040 to cause the device 1005 to perform various aspects of dynamic time division duplexing for enhanced sidelink control signaling as described herein, or the processor 1040 and the memory 1030 may be otherwise configured to perform or support such operations.

Figure 11:
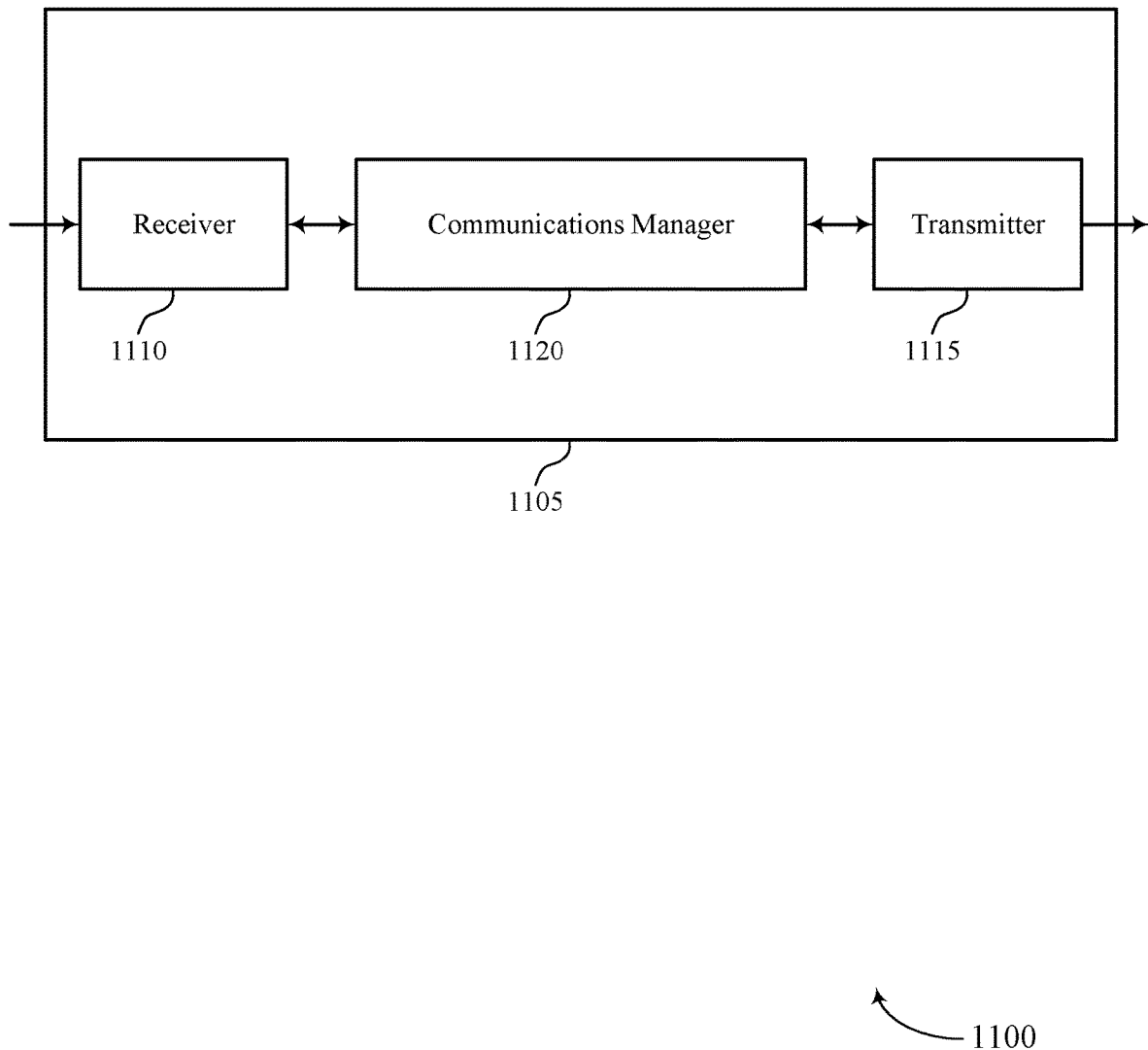
FIGS. 11 and 12 show block diagrams of devices that support dynamic time division duplexing for enhanced sidelink control signaling in accordance with aspects of the present disclosure.

FIG. 11 shows a block diagram 1100 of a device 1105 that supports dynamic time division duplexing for enhanced sidelink control signaling in accordance with aspects of the present disclosure. The device 1105 may be an example of aspects of a base station 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for receiving information such as packets, user data, control information, or any combination thereof associated with various information channels (e.g., control channels, data channels, information channels related to dynamic time division duplexing for enhanced sidelink control signaling). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to dynamic time division duplexing for enhanced sidelink control signaling). In some examples, the transmitter 1115 may be co-located with a receiver 1110 in a transceiver module. The transmitter 1115 may utilize a single antenna or a set of multiple antennas.

The communications manager 1120, the receiver 1110, the transmitter 1115, or various combinations thereof or various components thereof may be examples of means for performing various aspects of dynamic time division duplexing for enhanced sidelink control signaling as described herein. For example, the communications manager 1120, the receiver 1110, the transmitter 1115, or various combinations or components thereof may support a method for performing one or more of the functions described herein.

In some examples, the communications manager 1120, the receiver 1110, the transmitter 1115, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1120, the receiver 1110, the transmitter 1115, or various combinations or components thereof may be implemented in code (e.g., as communications management software or firmware) executed by a processor. If implemented in code executed by a processor, the functions of the communications manager 1120, the receiver 1110, the transmitter 1115, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1120 may be configured to perform various operations (e.g., receiving, monitoring, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to receive information, transmit information, or perform various other operations as described herein.

The communications manager 1120 may support wireless communications at a second wireless device in accordance with examples as disclosed herein. For example, the communications manager 1120 may be configured as or otherwise support a means for transmitting, to a first wireless device and via a sidelink communication link in a first slot, sidelink control information including a scheduling for an uplink transmission from the first wireless device to the second wireless device during a second slot. The communications manager 1120 may be configured as or otherwise support a means for switching an operating mode of the second wireless device to receive the uplink transmission in the second slot in accordance with the scheduling.

By including or configuring the communications manager 1120 in accordance with examples as described herein, the device 1105 (e.g., a processor controlling or otherwise coupled to the receiver 1110, the transmitter 1115, the communications manager 1120, or a combination thereof) may support techniques for reduced processing, increased inter-device coordination, and more efficient utilization of communication resources.

Figure 12:
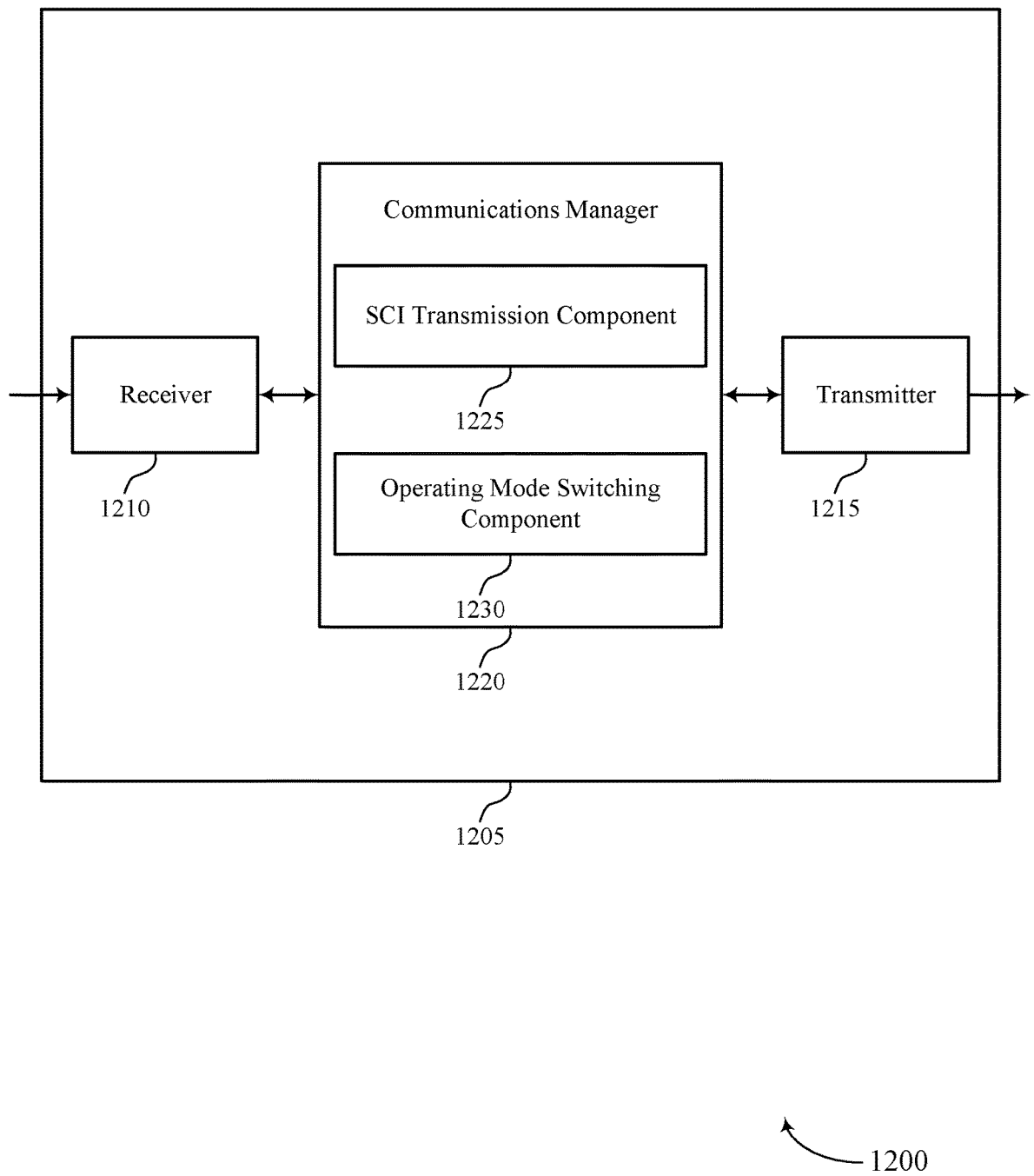

FIG. 12 shows a block diagram 1200 of a device 1205 that supports dynamic time division duplexing for enhanced sidelink control signaling in accordance with aspects of the present disclosure. The device 1205 may be an example of aspects of a device 1105 or a base station 105 as described herein. The device 1205 may include a receiver 1210, a transmitter 1215, and a communications manager 1220. The device 1205 may also include a processor. Each of these components may be in communication with one another (e.g., via one or more buses).

The receiver 1210 may provide a means for receiving information such as packets, user data, control information, or any combination thereof associated with various information channels (e.g., control channels, data channels, information channels related to dynamic time division duplexing for enhanced sidelink control signaling). Information may be passed on to other components of the device 1205. The receiver 1210 may utilize a single antenna or a set of multiple antennas.

The transmitter 1215 may provide a means for transmitting signals generated by other components of the device 1205. For example, the transmitter 1215 may transmit information such as packets, user data, control information, or any combination thereof associated with various information channels (e.g., control channels, data channels, information channels related to dynamic time division duplexing for enhanced sidelink control signaling). In some examples, the transmitter 1215 may be co-located with a receiver 1210 in a transceiver module. The transmitter 1215 may utilize a single antenna or a set of multiple antennas.

The device 1205, or various components thereof, may be an example of means for performing various aspects of dynamic time division duplexing for enhanced sidelink control signaling as described herein. For example, the communications manager 1220 may include an SCI transmission component 1225 an operating mode switching component 1230, or any combination thereof. The communications manager 1220 may be an example of aspects of a communications manager 1120 as described herein. In some examples, the communications manager 1220, or various components thereof, may be configured to perform various operations (e.g., receiving, monitoring, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to receive information, transmit information, or perform various other operations as described herein.

The communications manager 1220 may support wireless communications at a second wireless device in accordance with examples as disclosed herein. The SCI transmission component 1225 may be configured as or otherwise support a means for transmitting, to a first wireless device and via a sidelink communication link in a first slot, sidelink control information including a scheduling for an uplink transmission from the first wireless device to the second wireless device during a second slot. The operating mode switching component 1230 may be configured as or otherwise support a means for switching an operating mode of the second wireless device to receive the uplink transmission in the second slot in accordance with the scheduling.

Figure 13:
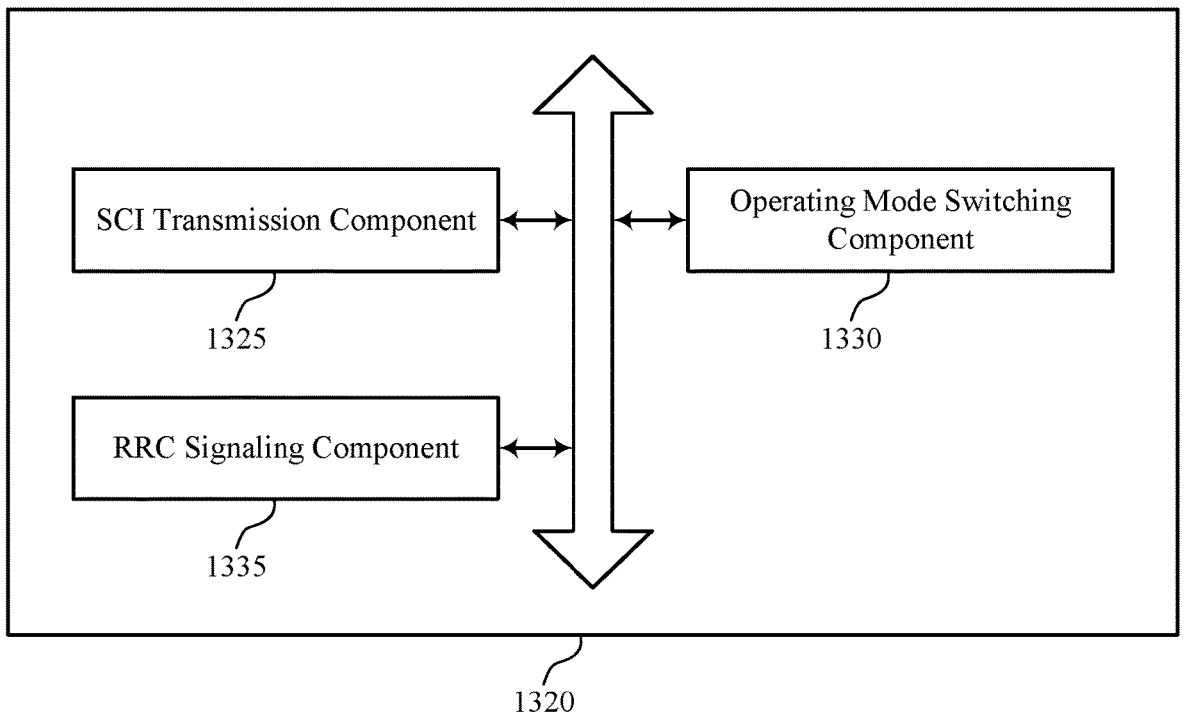
FIG. 13 shows a block diagram of a communications manager that supports dynamic time division duplexing for enhanced sidelink control signaling in accordance with aspects of the present disclosure.

FIG. 13 shows a block diagram 1300 of a communications manager 1320 that supports dynamic time division duplexing for enhanced sidelink control signaling in accordance with aspects of the present disclosure. The communications manager 1320 may be an example of aspects of a communications manager 1120, a communications manager 1220, or both, as described herein. The communications manager 1320, or various components thereof, may be an example of means for performing various aspects of dynamic time division duplexing for enhanced sidelink control signaling as described herein. For example, the communications manager 1320 may include an SCI transmission component 1325, an operating mode switching component 1330, an RRC signaling component 1335, or any combination thereof. Each of these components may communicate, directly or indirectly, with one another (e.g., via one or more buses).

The communications manager 1320 may support wireless communications at a second wireless device in accordance with examples as disclosed herein. The SCI transmission component 1325 may be configured as or otherwise support a means for transmitting, to a first wireless device and via a sidelink communication link in a first slot, sidelink control information including a scheduling for an uplink transmission from the first wireless device to the second wireless device during a second slot. The operating mode switching component 1330 may be configured as or otherwise support a means for switching an operating mode of the second wireless device to receive the uplink transmission in the second slot in accordance with the scheduling.

In some examples, to support switching the operating mode of the second wireless device, the operating mode switching component 1330 may be configured as or otherwise support a means for switching from a transmitting mode in the first slot to a receiving mode in the second slot to receive the uplink transmission from the first wireless device in the second slot.

In some examples, the second wireless device switches from a transmitting mode to a receiving mode based on a time offset between transmitting the sidelink control information and scheduling of the uplink transmission.

In some examples, the RRC signaling component 1335 may be configured as or otherwise support a means for receiving a radio resource control message that indicates a set of sidelink resources of the sidelink communication link which are dedicated for transmission of uplink control information or reception of downlink control information, where the uplink transmission is transmitted via at least a portion of the set of sidelink resources. In some examples, the uplink transmission includes an uplink control information message, an uplink data message, or both.

Figure 14:
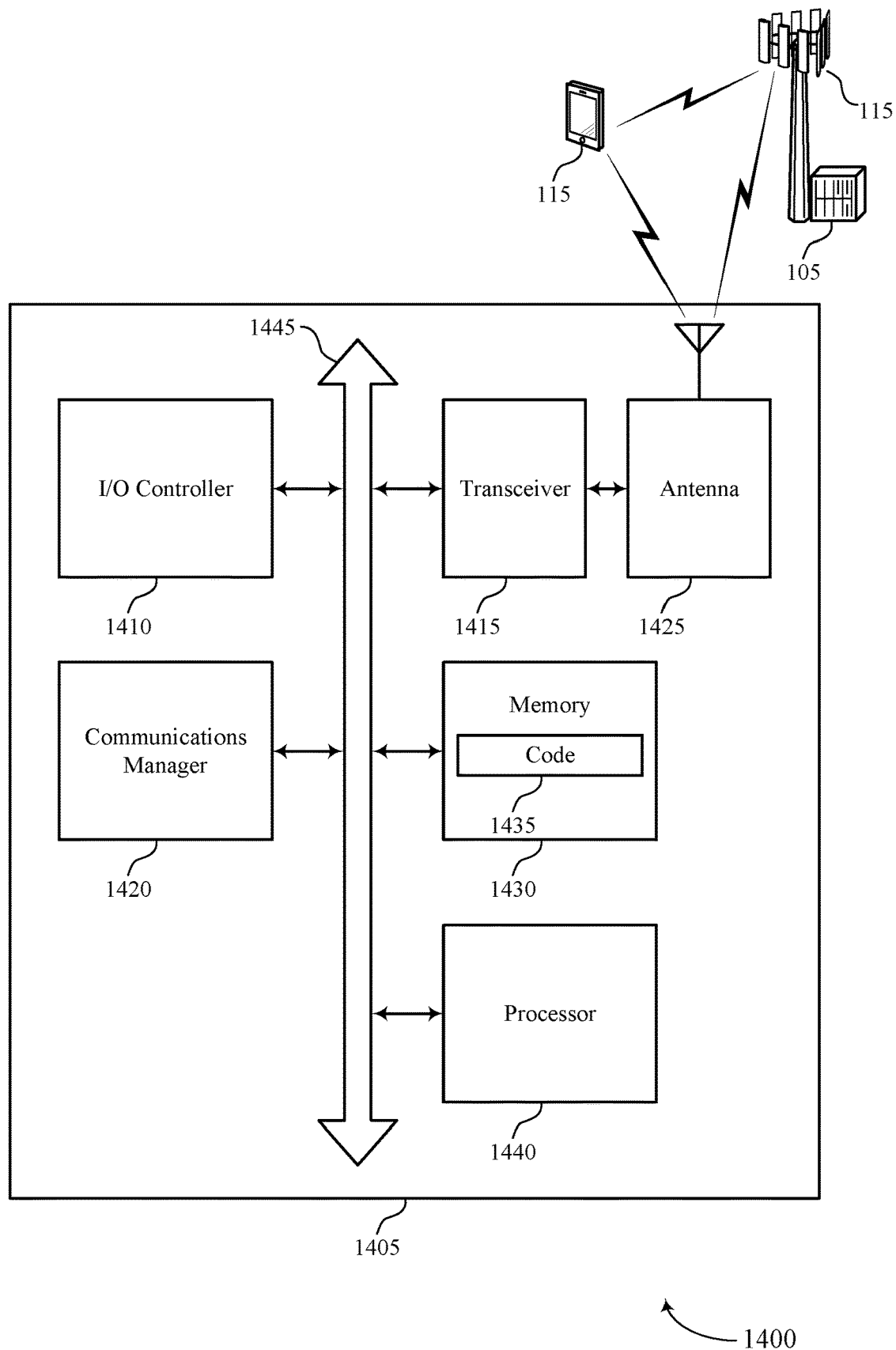
FIG. 14 shows a diagram of a system including a device that supports dynamic time division duplexing for enhanced sidelink control signaling in accordance with aspects of the present disclosure.

FIG. 14 shows a diagram of a system 1400 including a device 1405 that supports dynamic time division duplexing for enhanced sidelink control signaling in accordance with aspects of the present disclosure. The device 1405 may be an example of or include the components of a device 1105, a device 1205, or a base station 105 as described herein. The device 1405 may communicate wirelessly with one or more base stations 105, UEs 115, or any combination thereof. The device 1405 may include components for bi-directional voice and data communications including components for transmitting and receiving communications, such as a communications manager 1420, an I/O controller 1410, a transceiver 1415, an antenna 1425, a memory 1430, code 1435, and a processor 1440. These components may be coupled (e.g., operatively, communicatively, functionally, electronically, electrically) via one or more buses (e.g., a bus 1445).

The I/O controller 1410 may manage input and output signals for the device 1405. The I/O controller 1410 may also manage peripherals not integrated into the device 1405. In some cases, the I/O controller 1410 may represent a physical connection or port to an external peripheral. In some cases, the I/O controller 1410 may utilize an operating system such as iOS®, ANDROID®, MS-DOS®, MS-WINDOWS®, OS/2®, UNIX®, LINUX®, or another known operating system. Additionally or alternatively, the I/O controller 1410 may represent or interact with a modem, a keyboard, a mouse, a touchscreen, or a similar device. In some cases, the I/O controller 1410 may be implemented as part of a processor, such as the processor 1440. In some cases, a user may interact with the device 1405 via the I/O controller 1410 or via hardware components controlled by the I/O controller 1410.

In some cases, the device 1405 may include a single antenna 1425. However, in some other cases the device 1405 may have more than one antenna 1425, which may be capable of concurrently transmitting or receiving multiple wireless transmissions. The transceiver 1415 may communicate bi-directionally, via the one or more antennas 1425, wired, or wireless links as described herein. For example, the transceiver 1415 may represent a wireless transceiver and may communicate bi-directionally with another wireless transceiver. The transceiver 1415 may also include a modem to modulate the packets, to provide the modulated packets to one or more antennas 1425 for transmission, and to demodulate packets received from the one or more antennas 1425. The transceiver 1415, or the transceiver 1415 and one or more antennas 1425, may be an example of a transmitter 1115, a transmitter 1215, a receiver 1110, a receiver 1210, or any combination thereof or component thereof, as described herein.

The memory 1430 may include RAM and ROM. The memory 1430 may store computer-readable, computer-executable code 1435 including instructions that, when executed by the processor 1440, cause the device 1405 to perform various functions described herein. The code 1435 may be stored in a non-transitory computer-readable medium such as system memory or another type of memory. In some cases, the code 1435 may not be directly executable by the processor 1440 but may cause a computer (e.g., when compiled and executed) to perform functions described herein. In some cases, the memory 1430 may contain, among other things, a BIOS which may control basic hardware or software operation such as the interaction with peripheral components or devices.

The processor 1440 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In some other cases, a memory controller may be integrated into the processor 1440. The processor 1440 may be configured to execute computer-readable instructions stored in a memory (e.g., the memory 1430) to cause the device 1405 to perform various functions (e.g., functions or tasks supporting dynamic time division duplexing for enhanced sidelink control signaling). For example, the device 1405 or a component of the device 1405 may include a processor 1440 and memory 1430 coupled to the processor 1440, the processor 1440 and memory 1430 configured to perform various functions described herein.

The communications manager 1420 may support wireless communications at a second wireless device in accordance with examples as disclosed herein. For example, the communications manager 1420 may be configured as or otherwise support a means for transmitting, to a first wireless device and via a sidelink communication link in a first slot, sidelink control information including a scheduling for an uplink transmission from the first wireless device to the second wireless device during a second slot. The communications manager 1420 may be configured as or otherwise support a means for switching an operating mode of the second wireless device to receive the uplink transmission in the second slot in accordance with the scheduling.

By including or configuring the communications manager 1420 in accordance with examples as described herein, the device 1405 may support techniques for increased communication reliability, reduced latency, improved user experience related to reduced scheduling collisions, reduced latency, more efficient utilization of communication resources, improved coordination between devices operating in a TDD configuration, and improved reliability.

In some examples, the communications manager 1420 may be configured to perform various operations (e.g., receiving, monitoring, transmitting) using or otherwise in cooperation with the transceiver 1415, the one or more antennas 1425, or any combination thereof. Although the communications manager 1420 is illustrated as a separate component, in some examples, one or more functions described with reference to the communications manager 1420 may be supported by or performed by the processor 1440, the memory 1430, the code 1435, or any combination thereof. For example, the code 1435 may include instructions executable by the processor 1440 to cause the device 1405 to perform various aspects of dynamic time division duplexing for enhanced sidelink control signaling as described herein, or the processor 1440 and the memory 1430 may be otherwise configured to perform or support such operations.

Figure 15:
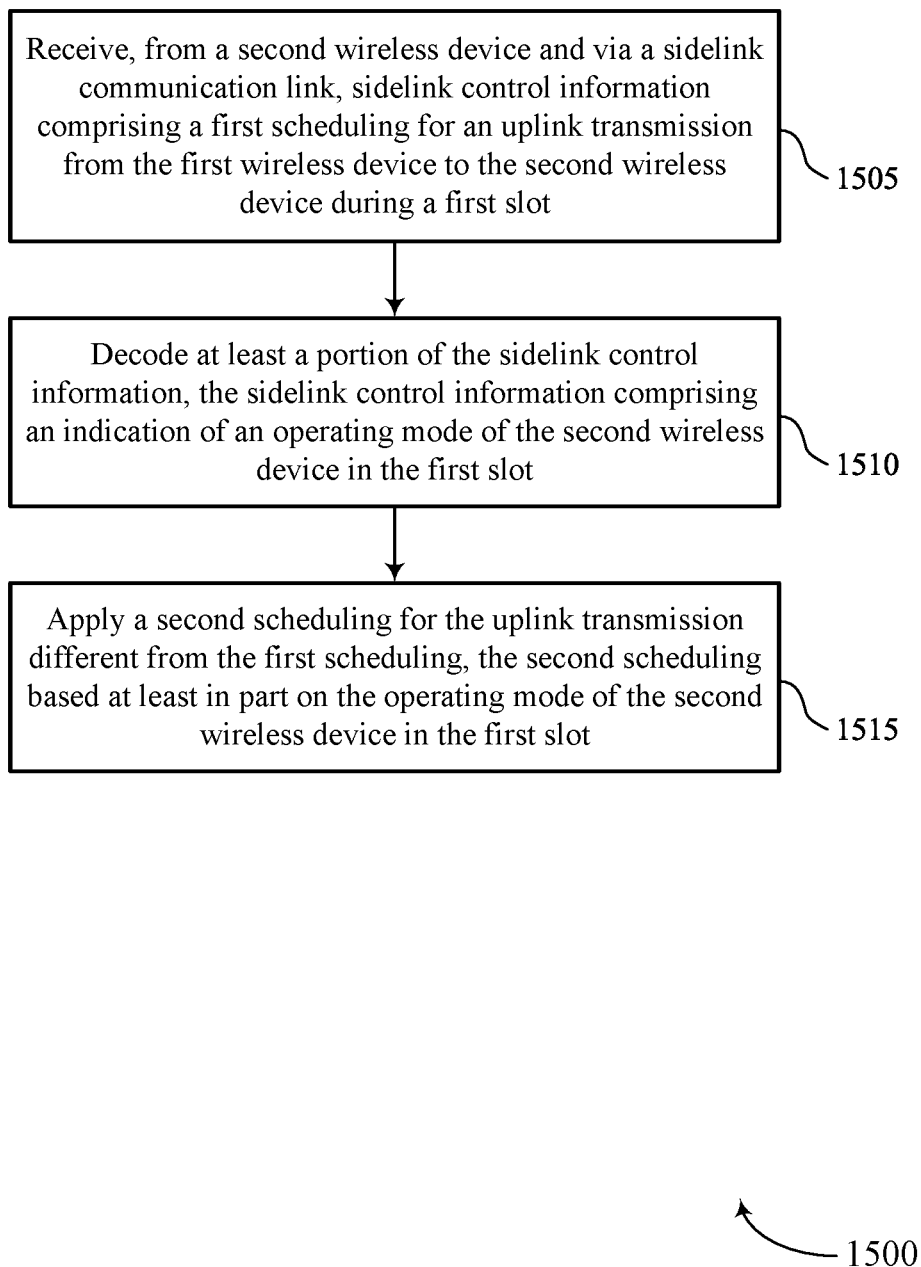
FIGS. 15 through 20 show flowcharts illustrating methods that support dynamic time division duplexing for enhanced sidelink control signaling in accordance with aspects of the present disclosure.

FIG. 15 shows a flowchart illustrating a method 1500 that supports dynamic time division duplexing for enhanced sidelink control signaling in accordance with aspects of the present disclosure. The operations of the method 1500 may be implemented by a UE or its components as described herein. For example, the operations of the method 1500 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1505, the method may include receiving, from a second wireless device and via a sidelink communication link, sidelink control information including a first scheduling for an uplink transmission from the first wireless device to the second wireless device during a first slot. The operations of 1505 may be performed in accordance with examples as disclosed herein. In some examples, aspects of the operations of 1505 may be performed by an SCI receiver component 925 as described with reference to FIG. 9.

At 1510, the method may include decoding at least a portion of the sidelink control information, the sidelink control information including an indication of an operating mode of the second wireless device in the first slot. The operations of 1510 may be performed in accordance with examples as disclosed herein. In some examples, aspects of the operations of 1510 may be performed by an SCI decoding component 930 as described with reference to FIG. 9.

At 1515, the method may include applying a second scheduling for the uplink transmission different from the first scheduling, the second scheduling based on the operating mode of the second wireless device in the first slot. The operations of 1515 may be performed in accordance with examples as disclosed herein. In some examples, aspects of the operations of 1515 may be performed by a scheduling component 935 as described with reference to FIG. 9.

Figure 16:
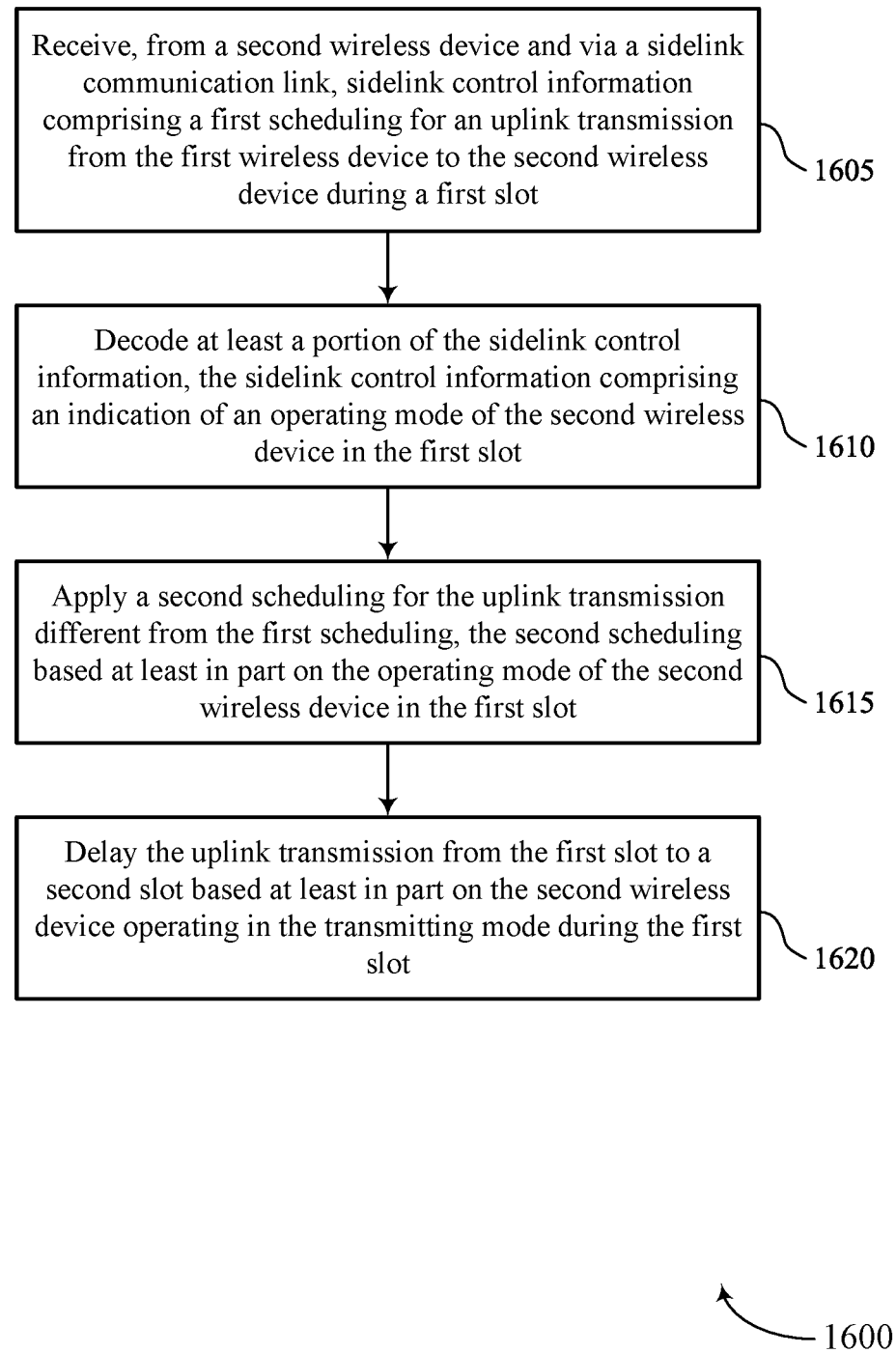

FIG. 16 shows a flowchart illustrating a method 1600 that supports dynamic time division duplexing for enhanced sidelink control signaling in accordance with aspects of the present disclosure. The operations of the method 1600 may be implemented by a UE or its components as described herein. For example, the operations of the method 1600 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1605, the method may include receiving, from a second wireless device and via a sidelink communication link, sidelink control information including a first scheduling for an uplink transmission from the first wireless device to the second wireless device during a first slot. The operations of 1605 may be performed in accordance with examples as disclosed herein. In some examples, aspects of the operations of 1605 may be performed by an SCI receiver component 925 as described with reference to FIG. 9.

At 1610, the method may include decoding at least a portion of the sidelink control information, the sidelink control information including an indication of an operating mode of the second wireless device in the first slot. The operations of 1610 may be performed in accordance with examples as disclosed herein. In some examples, aspects of the operations of 1610 may be performed by an SCI decoding component 930 as described with reference to FIG. 9.

At 1615, the method may include applying a second scheduling for the uplink transmission different from the first scheduling, the second scheduling based on the operating mode of the second wireless device in the first slot. The operations of 1615 may be performed in accordance with examples as disclosed herein. In some examples, aspects of the operations of 1615 may be performed by a scheduling component 935 as described with reference to FIG. 9.

At 1620, the method may include delaying the uplink transmission from the first slot to a second slot based on the second wireless device operating in the transmitting mode during the first slot. The operations of 1620 may be performed in accordance with examples as disclosed herein. In some examples, aspects of the operations of 1620 may be performed by a scheduling component 935 as described with reference to FIG. 9.

Figure 17:
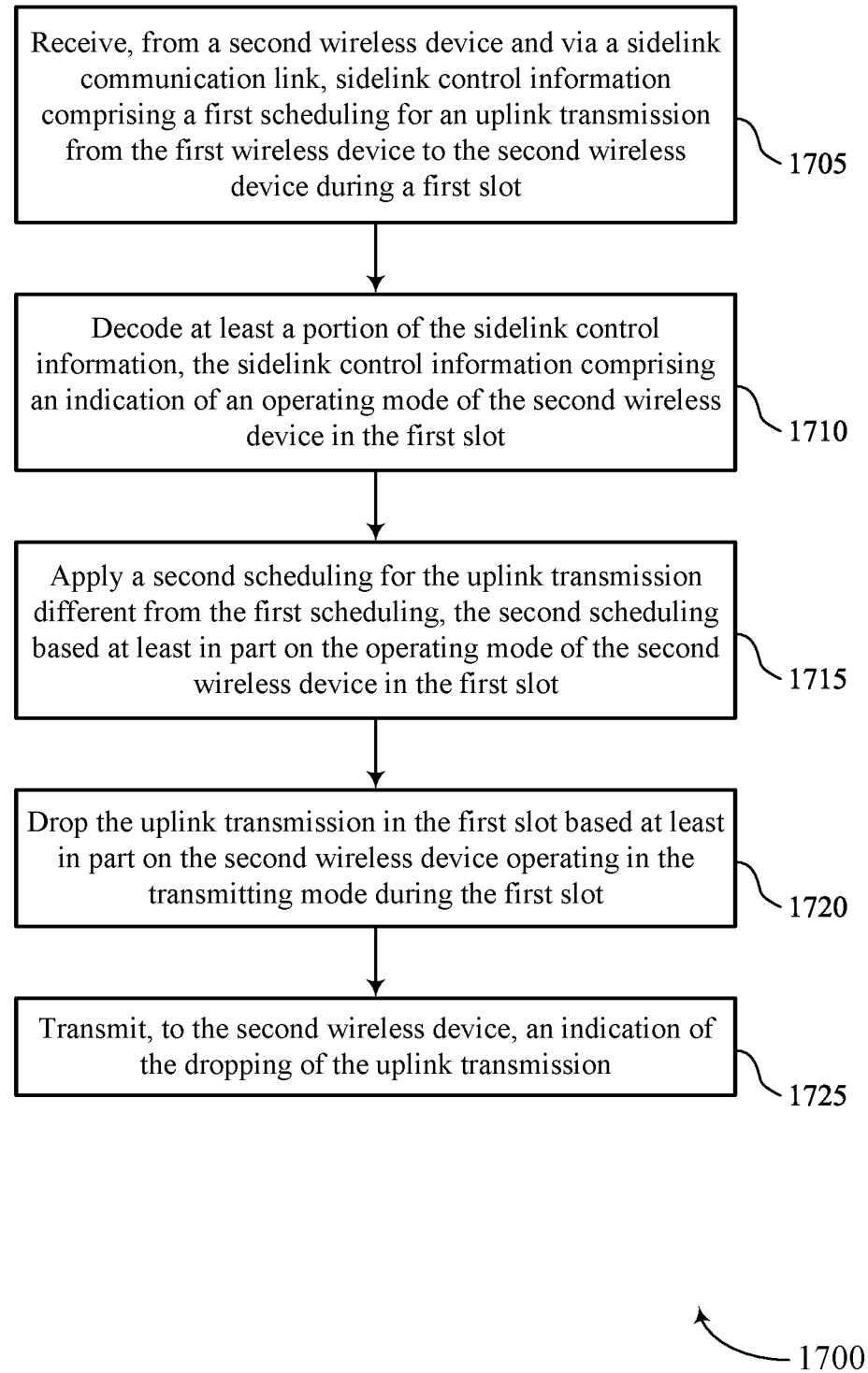

FIG. 17 shows a flowchart illustrating a method 1700 that supports dynamic time division duplexing for enhanced sidelink control signaling in accordance with aspects of the present disclosure. The operations of the method 1700 may be implemented by a UE or its components as described herein. For example, the operations of the method 1700 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1705, the method may include receiving, from a second wireless device and via a sidelink communication link, sidelink control information including a first scheduling for an uplink transmission from the first wireless device to the second wireless device during a first slot. The operations of 1705 may be performed in accordance with examples as disclosed herein. In some examples, aspects of the operations of 1705 may be performed by an SCI receiver component 925 as described with reference to FIG. 9.

At 1710, the method may include decoding at least a portion of the sidelink control information, the sidelink control information including an indication of an operating mode of the second wireless device in the first slot. The operations of 1710 may be performed in accordance with examples as disclosed herein. In some examples, aspects of the operations of 1710 may be performed by an SCI decoding component 930 as described with reference to FIG. 9.

At 1715, the method may include applying a second scheduling for the uplink transmission different from the first scheduling, the second scheduling based on the operating mode of the second wireless device in the first slot. The operations of 1715 may be performed in accordance with examples as disclosed herein. In some examples, aspects of the operations of 1715 may be performed by a scheduling component 935 as described with reference to FIG. 9.

At 1720, the method may include dropping the uplink transmission in the first slot based on the second wireless device operating in the transmitting mode during the first slot. The operations of 1720 may be performed in accordance with examples as disclosed herein. In some examples, aspects of the operations of 1720 may be performed by a transmission dropping component 940 as described with reference to FIG. 9.

At 1725, the method may include transmitting, to the second wireless device, an indication of the dropping of the uplink transmission. The operations of 1725 may be performed in accordance with examples as disclosed herein. In some examples, aspects of the operations of 1725 may be performed by a transmission dropping component 940 as described with reference to FIG. 9.

Figure 18:
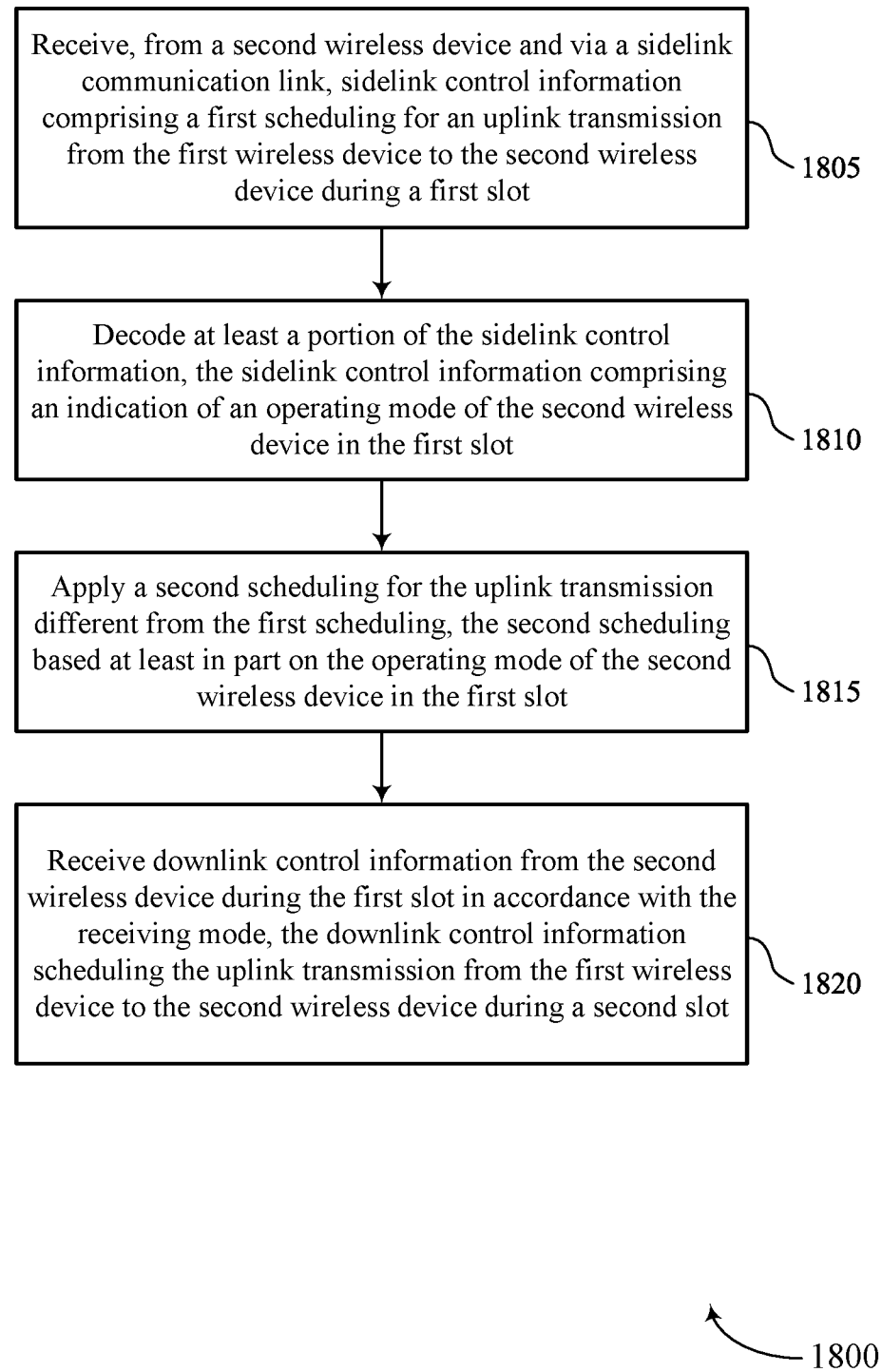

FIG. 18 shows a flowchart illustrating a method 1800 that supports dynamic time division duplexing for enhanced sidelink control signaling in accordance with aspects of the present disclosure. The operations of the method 1800 may be implemented by a UE or its components as described herein. For example, the operations of the method 1800 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1805, the method may include receiving, from a second wireless device and via a sidelink communication link, sidelink control information including a first scheduling for an uplink transmission from the first wireless device to the second wireless device during a first slot. The operations of 1805 may be performed in accordance with examples as disclosed herein. In some examples, aspects of the operations of 1805 may be performed by an SCI receiver component 925 as described with reference to FIG. 9.

At 1810, the method may include decoding at least a portion of the sidelink control information, the sidelink control information including an indication of an operating mode of the second wireless device in the first slot. The operations of 1810 may be performed in accordance with examples as disclosed herein. In some examples, aspects of the operations of 1810 may be performed by an SCI decoding component 930 as described with reference to FIG. 9.

At 1815, the method may include applying a second scheduling for the uplink transmission different from the first scheduling, the second scheduling based on the operating mode of the second wireless device in the first slot. The operations of 1815 may be performed in accordance with examples as disclosed herein. In some examples, aspects of the operations of 1815 may be performed by a scheduling component 935 as described with reference to FIG. 9.

At 1820, the method may include receiving downlink control information from the second wireless device during the first slot in accordance with the receiving mode, the downlink control information scheduling the uplink transmission from the first wireless device to the second wireless device during a second slot. The operations of 1820 may be performed in accordance with examples as disclosed herein. In some examples, aspects of the operations of 1820 may be performed by a scheduling component 935 as described with reference to FIG. 9.

Figure 19:
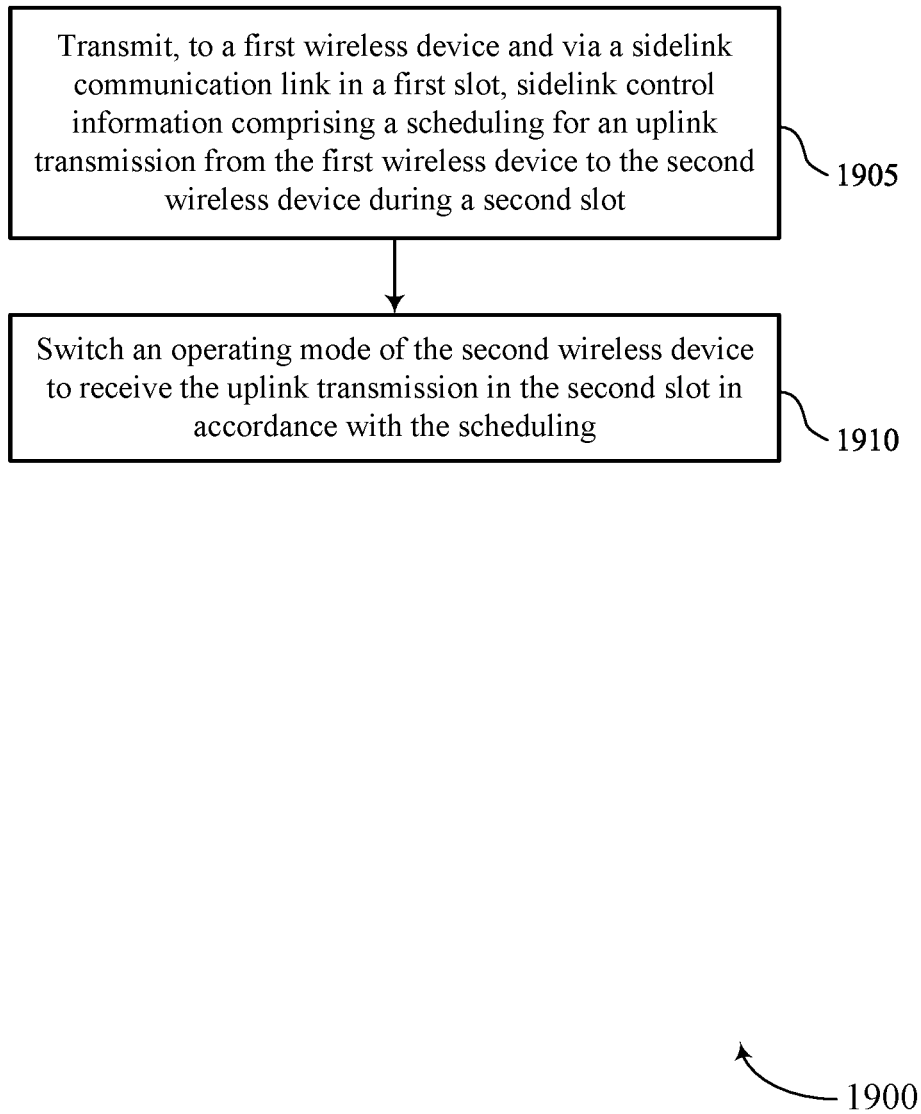

FIG. 19 shows a flowchart illustrating a method 1900 that supports dynamic time division duplexing for enhanced sidelink control signaling in accordance with aspects of the present disclosure. The operations of the method 1900 may be implemented by a base station or its components as described herein. For example, the operations of the method 1900 may be performed by a base station 105 as described with reference to FIGS. 1 through 6 and 11 through 14. In some examples, a base station may execute a set of instructions to control the functional elements of the base station to perform the described functions. Additionally or alternatively, the base station may perform aspects of the described functions using special-purpose hardware.

At 1905, the method may include transmitting, to a first wireless device and via a sidelink communication link in a first slot, sidelink control information including a scheduling for an uplink transmission from the first wireless device to the second wireless device during a second slot. The operations of 1905 may be performed in accordance with examples as disclosed herein. In some examples, aspects of the operations of 1905 may be performed by an SCI transmission component 1325 as described with reference to FIG. 13.

At 1910, the method may include switching an operating mode of the second wireless device to receive the uplink transmission in the second slot in accordance with the scheduling. The operations of 1910 may be performed in accordance with examples as disclosed herein. In some examples, aspects of the operations of 1910 may be performed by an operating mode switching component 1330 as described with reference to FIG. 13.

Figure 20:
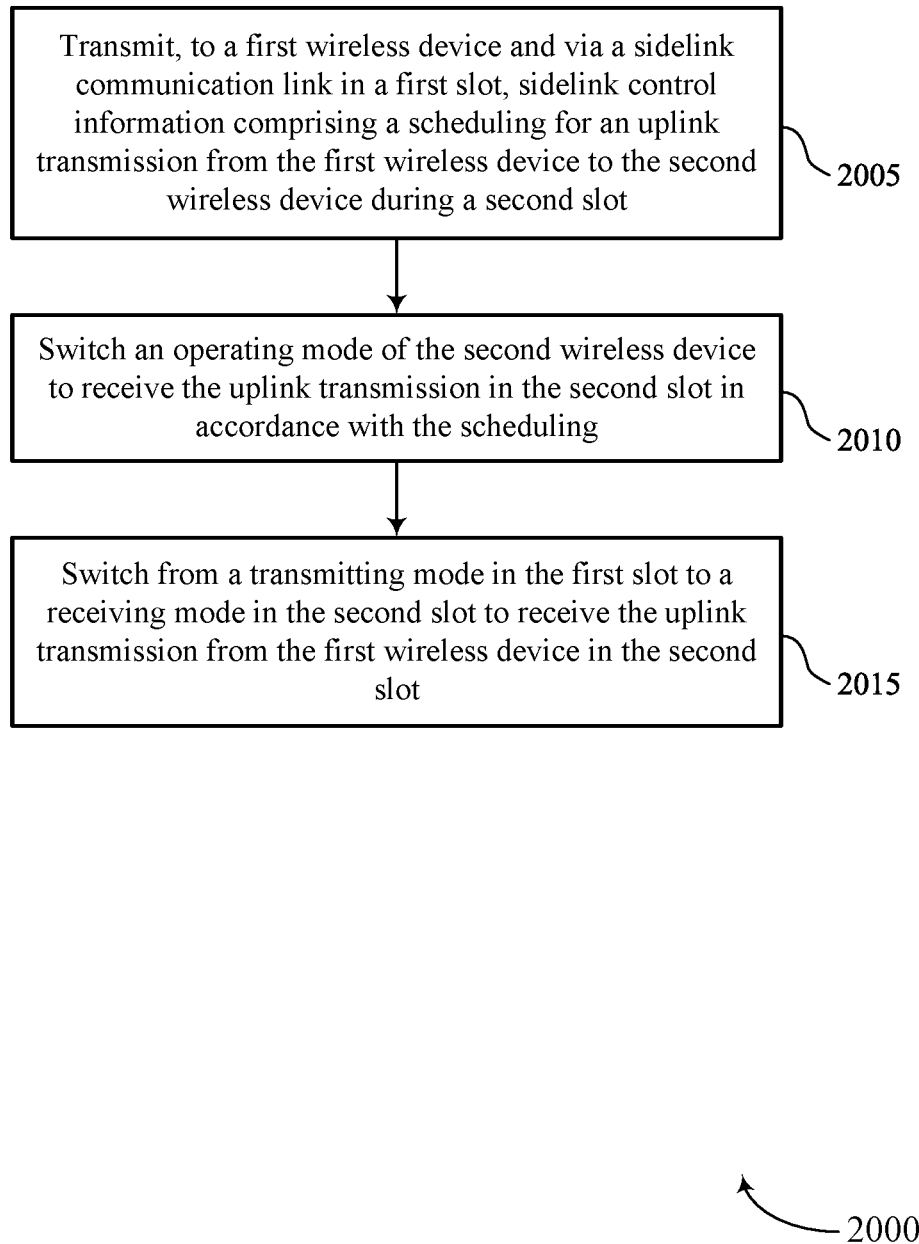

FIG. 20 shows a flowchart illustrating a method 2000 that supports dynamic time division duplexing for enhanced sidelink control signaling in accordance with aspects of the present disclosure. The operations of the method 2000 may be implemented by a base station or its components as described herein. For example, the operations of the method 2000 may be performed by a base station 105 as described with reference to FIGS. 1 through 6 and 11 through 14. In some examples, a base station may execute a set of instructions to control the functional elements of the base station to perform the described functions. Additionally or alternatively, the base station may perform aspects of the described functions using special-purpose hardware.

At 2005, the method may include transmitting, to a first wireless device and via a sidelink communication link in a first slot, sidelink control information including a scheduling for an uplink transmission from the first wireless device to the second wireless device during a second slot. The operations of 2005 may be performed in accordance with examples as disclosed herein. In some examples, aspects of the operations of 2005 may be performed by an SCI transmission component 1325 as described with reference to FIG. 13.

At 2010, the method may include switching an operating mode of the second wireless device to receive the uplink transmission in the second slot in accordance with the scheduling. The operations of 2010 may be performed in accordance with examples as disclosed herein. In some examples, aspects of the operations of 2010 may be performed by an operating mode switching component 1330 as described with reference to FIG. 13.

At 2015, the method may include switching from a transmitting mode in the first slot to a receiving mode in the second slot to receive the uplink transmission from the first wireless device in the second slot. The operations of 2015 may be performed in accordance with examples as disclosed herein. In some examples, aspects of the operations of 2015 may be performed by an operating mode switching component 1330 as described with reference to FIG. 13.

SUMMARY OF ASPECTS

The following provides an overview of aspects of the present disclosure:

Aspect 1: A method for wireless communications at a first wireless device, comprising: receiving, from a second wireless device and via a sidelink communication link, sidelink control information comprising a first scheduling for an uplink transmission from the first wireless device to the second wireless device during a first slot; decoding at least a portion of the sidelink control information, the sidelink control information comprising an indication of an operating mode of the second wireless device in the first slot; and applying a second scheduling for the uplink transmission different from the first scheduling, the second scheduling based at least in part on the operating mode of the second wireless device in the first slot.

Aspect 2: The method of aspect 1, further comprising: determining an operating mode of the first wireless device during the first slot based at least in part on the sidelink control information, wherein applying the second scheduling of the uplink transmission is further based at least in part on the operating mode of the first wireless device in the first slot.

Aspect 3: The method of any of aspects 1 through 2, wherein the operating mode of the second wireless device during the first slot is a transmitting mode, and wherein applying the second scheduling of the uplink transmission comprises: delaying the uplink transmission from the first slot to a second slot based at least in part on the second wireless device operating in the transmitting mode during the first slot.

Aspect 4: The method of any of aspects 1 through 3, wherein the operating mode of the second wireless device during the first slot is a transmitting mode, and wherein applying the second scheduling of the uplink transmission comprises: dropping the uplink transmission in the first slot based at least in part on the second wireless device operating in the transmitting mode during the first slot; and transmitting, to the second wireless device, an indication of the dropping of the uplink transmission.

Aspect 5: The method of aspect 4, further comprising: receiving, from the second wireless device, a rescheduling of the uplink transmission in a second slot based at least in part on the dropping of the uplink transmission in the first slot Aspect 6: The method of any of aspects 1 through 5, wherein the operating mode of the second wireless device during the first slot is a transmitting mode and the operating mode of the first wireless device is a receiving mode, and wherein applying the second scheduling of the uplink transmission comprises: receiving downlink control information from the second wireless device during the first slot in accordance with the receiving mode, the downlink control information scheduling the uplink transmission from the first wireless device to the second wireless device during a second slot.

Aspect 7: The method of any of aspects 1 through 6, wherein the indication of the operating mode comprises a transmitter identifier associated with the second wireless device received in a second portion of the sidelink control information.

Aspect 8: The method of any of aspects 1 through 6, wherein the indication of the operating mode comprises a one-bit indication of the operating mode of the first wireless device or the second wireless device received in a first portion of the sidelink control information.

Aspect 9: The method of any of aspects 1 through 6, wherein the indication of the operating mode comprises a cyclic redundancy check scrambling sequence associated with the first wireless device or the second wireless device received in a first portion of the sidelink control information.

Aspect 10: The method of any of aspects 1 through 9, wherein scheduling the uplink transmission is based at least in part on a time offset between receiving the sidelink control information and transmitting the uplink transmission.

Aspect 11: The method of any of aspects 1 through 10, further comprising: receiving a radio resource control message that indicates a set of sidelink resources of the sidelink communication link which are dedicated for transmission of uplink control information or reception of downlink control information, wherein the uplink transmission is transmitted via at least a subset of the set of sidelink resources.

Aspect 12: The method of any of aspects 1 through 11, wherein the uplink transmission comprises an uplink control information message, an uplink data message, or both.

Aspect 13: A method for wireless communications at a second wireless device, comprising: transmitting, to a first wireless device and via a sidelink communication link in a first slot, sidelink control information comprising a scheduling for an uplink transmission from the first wireless device to the second wireless device during a second slot; and switching an operating mode of the second wireless device to receive the uplink transmission in the second slot in accordance with the scheduling.

Aspect 14: The method of aspect 13, wherein switching the operating mode of the second wireless device comprises: switching from a transmitting mode in the first slot to a receiving mode in the second slot to receive the uplink transmission from the first wireless device in the second slot.

Aspect 15: The method of any of aspects 13 through 14, wherein the second wireless device switches from a transmitting mode to a receiving mode based at least in part on a time offset between transmitting the sidelink control information and scheduling of the uplink transmission.

Aspect 16: The method of any of aspects 13 through 15, further comprising: receiving a radio resource control message that indicates a set of sidelink resources of the sidelink communication link which are dedicated for transmission of uplink control information or reception of downlink control information, wherein the uplink transmission is transmitted via at least a portion of the set of sidelink resources.

Aspect 17: The method of any of aspects 13 through 16, wherein the uplink transmission comprises an uplink control information message, an uplink data message, or both.

Aspect 18: An apparatus for wireless communications at a first wireless device, comprising a processor; memory coupled with the processor; and instructions stored in the memory and executable by the processor to cause the apparatus to perform a method of any of aspects 1 through 12.

Aspect 19: An apparatus for wireless communications at a first wireless device, comprising at least one means for performing a method of any of aspects 1 through 12.

Aspect 20: A non-transitory computer-readable medium storing code for wireless communications at a first wireless device, the code comprising instructions executable by a processor to perform a method of any of aspects 1 through 12.

Aspect 21: An apparatus for wireless communications at a second wireless device, comprising a processor; memory coupled with the processor; and instructions stored in the memory and executable by the processor to cause the apparatus to perform a method of any of aspects 13 through 17.

Aspect 22: An apparatus for wireless communications at a second wireless device, comprising at least one means for performing a method of any of aspects 13 through 17.

Aspect 23: A non-transitory computer-readable medium storing code for wireless communications at a second wireless device, the code comprising instructions executable by a processor to perform a method of any of aspects 13 through 17.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a first wireless device, comprising:
   receiving, from a second wireless device and via a sidelink communication link, sidelink control information comprising a first scheduling for an uplink control transmission from the first wireless device to the second wireless device during a first slot;
   decoding at least a portion of the sidelink control information, the sidelink control information comprising an indication of an operating mode of the second wireless device in the first slot, wherein the indication of the operating mode is received in a temporally first portion of the sidelink control information; and
   applying a second scheduling for the uplink control transmission different from the first scheduling, the second scheduling based at least in part on the operating mode of the second wireless device in the first slot.

2. The method of claim 1, further comprising:
determining the operating mode of the first wireless device during the first slot based at least in part on the sidelink control information, wherein applying the second scheduling of the uplink control transmission is further based at least in part on the operating mode of the first wireless device in the first slot.

3. The method of claim 1, wherein the operating mode of the second wireless device during the first slot is a transmitting mode, and wherein applying the second scheduling of the uplink control transmission comprises:
delaying the uplink control transmission from the first slot to a second slot based at least in part on the second wireless device operating in the transmitting mode during the first slot.

4. The method of claim 1, wherein the operating mode of the second wireless device during the first slot is a transmitting mode, and wherein applying the second scheduling of the uplink control transmission comprises:
dropping the uplink control transmission in the first slot based at least in part on the second wireless device operating in the transmitting mode during the first slot; and
transmitting, to the second wireless device, an indication of dropping the uplink control transmission.

5. The method of claim 4, further comprising:
receiving, from the second wireless device, a rescheduling of the uplink control transmission in a second slot based at least in part on dropping the uplink control transmission in the first slot.

6. The method of claim 1, wherein the operating mode of the second wireless device during the first slot is a transmitting mode and the operating mode of the first wireless device is a receiving mode, and wherein applying the second scheduling of the uplink control transmission comprises:
receiving downlink control information from the second wireless device during the first slot in accordance with the receiving mode, the downlink control information scheduling the uplink control transmission from the first wireless device to the second wireless device during a second slot.

7. The method of claim 1, wherein the indication of the operating mode comprises a transmitter identifier associated with the second wireless device received in a temporally second portion of the sidelink control information.

8. The method of claim 1, wherein the indication of the operating mode comprises a one-bit indication of the operating mode of the first wireless device or the second wireless device received in the temporally first portion of the sidelink control information.

9. The method of claim 1, wherein the indication of the operating mode comprises a cyclic redundancy check scrambling sequence associated with the first wireless device or the second wireless device received in the temporally first portion of the sidelink control information.

10. The method of claim 1, wherein scheduling the uplink control transmission is based at least in part on a time offset between receiving the sidelink control information and transmitting the uplink control transmission.

11. The method of claim 1, further comprising:
receiving a radio resource control message that indicates a set of sidelink resources of the sidelink communication link which are dedicated for transmission of uplink control information or reception of downlink control information, wherein the uplink control transmission is transmitted via at least a subset of the set of sidelink resources.

12. A method for wireless communications at a second wireless device, comprising:
transmitting, to a first wireless device and via a sidelink communication link in a first slot, sidelink control information comprising a scheduling for an uplink control transmission from the first wireless device to the second wireless device during a second slot, wherein the sidelink control information further comprises an indication of an operating mode of the second wireless device in the second slot and is transmitted in a temporally first portion of the sidelink control information; and
switching the operating mode of the second wireless device to receive the uplink control transmission in the second slot in accordance with the scheduling.

13. The method of claim 12, wherein switching the operating mode of the second wireless device comprises:
switching from a transmitting mode in the first slot to a receiving mode in the second slot to receive the uplink control transmission from the first wireless device in the second slot.

14. The method of claim 12, further comprising:
switching from a transmitting mode to a receiving mode based at least in part on a time offset between transmitting the sidelink control information and the scheduling of the uplink control transmission.

15. The method of claim 12, further comprising:
receiving a radio resource control message that indicates a set of sidelink resources of the sidelink communication link which are dedicated for transmission of uplink control information or reception of downlink control information, wherein the uplink control transmission is transmitted via at least a portion of the set of sidelink resources.

16. An apparatus for wireless communications at a first wireless device, comprising:
a processor;
memory coupled with the processor; and
instructions stored in the memory and executable by the processor to cause the apparatus to:
receive, from a second wireless device and via a sidelink communication link, sidelink control information comprising a first scheduling for an uplink control transmission from the first wireless device to the second wireless device during a first slot;
decode at least a portion of the sidelink control information, the sidelink control information comprising an indication of an operating mode of the second wireless device in the first slot, wherein the indication of the operating mode is received in a temporally first portion of the sidelink control information; and
apply a second scheduling for the uplink control transmission different from the first scheduling, the second scheduling based at least in part on the operating mode of the second wireless device in the first slot.

17. The apparatus of claim 16, wherein the instructions are further executable by the processor to cause the apparatus to:
determine the operating mode of the first wireless device during the first slot based at least in part on the sidelink control information, wherein applying the second scheduling of the uplink control transmission is further based at least in part on the operating mode of the first wireless device in the first slot.

18. The apparatus of claim 16, wherein the instructions to apply the second scheduling of the uplink control transmission are executable by the processor to cause the apparatus to:
delay the uplink control transmission from the first slot to a second slot based at least in part on the second wireless device operating in a transmitting mode during the first slot.

19. The apparatus of claim 16, wherein the instructions to apply the second scheduling of the uplink control transmission are executable by the processor to cause the apparatus to:
drop the uplink control transmission in the first slot based at least in part on the second wireless device operating in a transmitting mode during the first slot; and
transmit, to the second wireless device, an indication of dropping of the uplink control transmission.

20. The apparatus of claim 19, wherein the instructions are further executable by the processor to cause the apparatus to:
receive, from the second wireless device, a rescheduling of the uplink control transmission in a second slot based at least in part on dropping the uplink control transmission in the first slot.

21. The apparatus of claim 16, wherein the instructions to apply the second scheduling of the uplink control transmission are executable by the processor to cause the apparatus to:
receive downlink control information from the second wireless device during the first slot in accordance with a receiving mode, the downlink control information scheduling the uplink control transmission from the first wireless device to the second wireless device during a second slot.

22. The apparatus of claim 16, wherein the indication of the operating mode comprises a transmitter identifier associated with the second wireless device received in a temporally second portion of the sidelink control information.

23. The apparatus of claim 16, wherein the indication of the operating mode comprises a one-bit indication of the operating mode of the first wireless device or the second wireless device received in the temporally first portion of the sidelink control information.

24. The apparatus of claim 16, wherein the indication of the operating mode comprises a cyclic redundancy check scrambling sequence associated with the first wireless device or the second wireless device received in the temporally first portion of the sidelink control information.

25. The apparatus of claim 16, wherein scheduling the uplink control transmission is based at least in part on a time offset between receiving the sidelink control information and transmitting the uplink control transmission.

26. An apparatus for wireless communications at a second wireless device, comprising:
a processor;
memory coupled with the processor; and
instructions stored in the memory and executable by the processor to cause the apparatus to:
transmit, to a first wireless device and via a sidelink communication link in a first slot, sidelink control information comprising a scheduling for an uplink control transmission from the first wireless device to the second wireless device during a second slot, wherein the sidelink control information further comprises an indication of an operating mode of the second wireless device in the second slot and is transmitted in a temporally first portion of the sidelink control information; and
switch the operating mode of the second wireless device to receive the uplink control transmission in the second slot in accordance with the scheduling.

27. The apparatus of claim 26, wherein the instructions to switch the operating mode of the second wireless device are executable by the processor to cause the apparatus to:
switch from a transmitting mode in the first slot to a receiving mode in the second slot to receive the uplink control transmission from the first wireless device in the second slot.

28. The apparatus of claim 26, wherein the instructions to switch the operating mode of the second wireless device are executable by the processor to cause the apparatus to:
switch from a transmitting mode to a receiving mode based at least in part on a time offset between transmitting the sidelink control information and the scheduling of the uplink control transmission.

\* \* \* \* \*